(12) United States Patent
Dor et al.

(10) Patent No.: US 9,483,413 B2
(45) Date of Patent: Nov. 1, 2016

(54) NONVOLATILE MEMORY DEVICES AND METHODS OF CONTROLLING THE SAME

(71) Applicant: Samsung Electronics Co., Ltd., Suwon-Si, Gyeonggi-Do (KR)

(72) Inventors: Avner Dor, Ramat Gan (IL); Elona Erez, Ramat Gan (IL); Shay Landis, Ramat Gan (IL); Jun Jin Kong, Yongin-si (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 78 days.

(21) Appl. No.: 14/523,159

(22) Filed: Oct. 24, 2014

(65) Prior Publication Data
US 2016/0117256 A1 Apr. 28, 2016

(51) Int. Cl.
*G06F 12/10* (2016.01)
(52) U.S. Cl.
CPC ..... *G06F 12/1009* (2013.01); *G06F 2212/152* (2013.01); *G06F 2212/2022* (2013.01); *G06F 2212/7201* (2013.01)
(58) Field of Classification Search
CPC ................ G06F 12/1009; G06F 2212/152; G06F 2212/2022
USPC .................................. 711/156, 103
See application file for complete search history.

(56) References Cited

U.S. PATENT DOCUMENTS

| | | | |
|---|---|---|---|
| 7,446,681 B2 | 11/2008 | Gunther | |
| 7,486,830 B2 | 2/2009 | Kimura | |
| 7,529,880 B2 | 5/2009 | Chung et al. | |
| 7,953,939 B2 | 5/2011 | Nakamura et al. | |
| 7,991,942 B2 | 8/2011 | Biswas et al. | |
| 8,180,954 B2 | 5/2012 | Kilzer et al. | |
| 2010/0023682 A1 | 1/2010 | Lee et al. | |
| 2010/0125694 A1 | 5/2010 | Choi | |
| 2010/0180072 A1 | 7/2010 | Kogita et al. | |
| 2010/0223237 A1 | 9/2010 | Mishra et al. | |
| 2011/0022819 A1 | 1/2011 | Post et al. | |
| 2011/0055458 A1 | 3/2011 | Kuehne | |
| 2011/0099321 A1 | 4/2011 | Haines et al. | |
| 2012/0102277 A1 | 4/2012 | Kim et al. | |
| 2012/0179859 A1 | 7/2012 | Kim et al. | |
| 2012/0191897 A1 | 7/2012 | Yang et al. | |
| 2013/0086304 A1* | 4/2013 | Ogawa | G06F 3/061 711/103 |
| 2013/0111116 A1* | 5/2013 | Inada | G06F 12/02 711/103 |
| 2014/0281333 A1* | 9/2014 | Peterson | G06F 12/0638 711/170 |

FOREIGN PATENT DOCUMENTS

KR 20090116505 A 11/2009
KR 20120074707 A 7/2012

* cited by examiner

*Primary Examiner* — Pierre-Michel Bataille
(74) *Attorney, Agent, or Firm* — Harness, Dickey & Pierce, P.L.C.

(57) ABSTRACT

At least one example embodiment discloses a method of controlling a nonvolatile memory device including a plurality of blocks, each block including a plurality of physical pages. The method includes receiving a plurality of logical pages associated with a first plurality of logical addresses, respectively, and writing the first plurality of logical pages to the plurality physical addresses according to an ascending order of the logical addresses of the first plurality of logical pages.

16 Claims, 18 Drawing Sheets

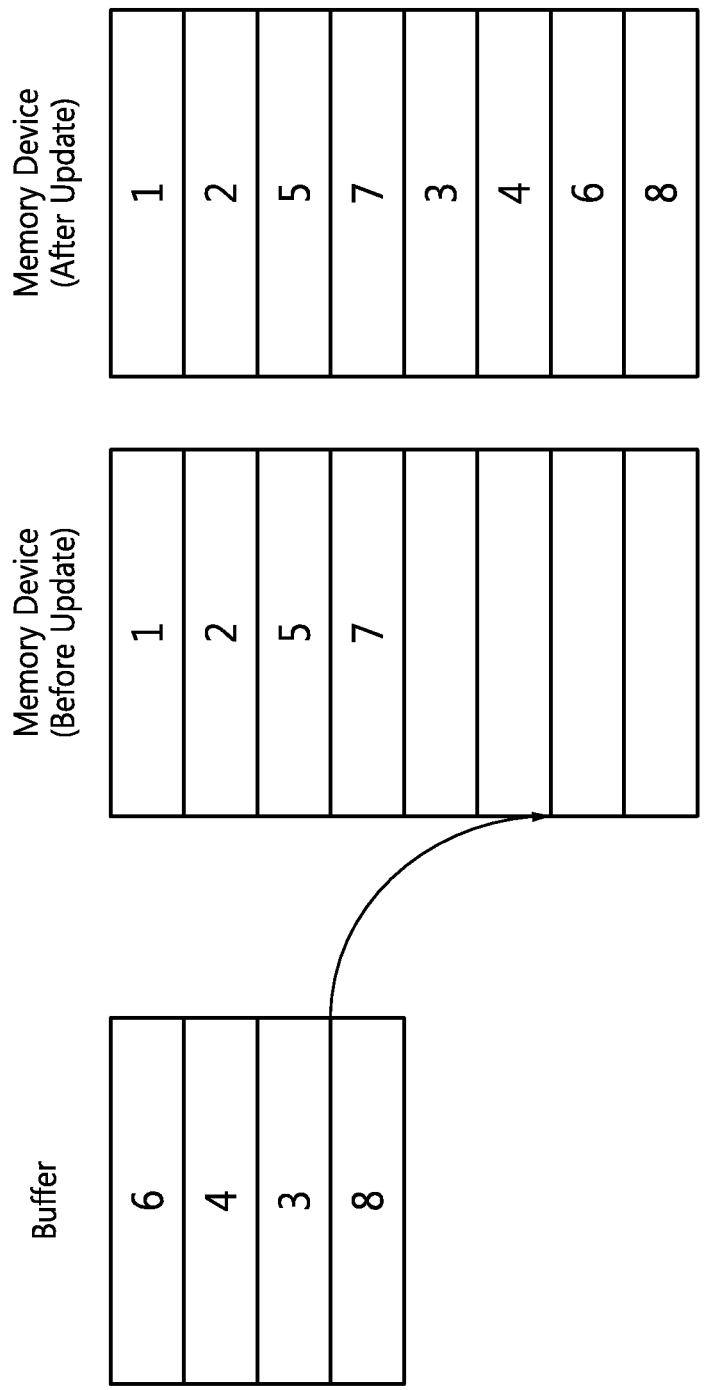

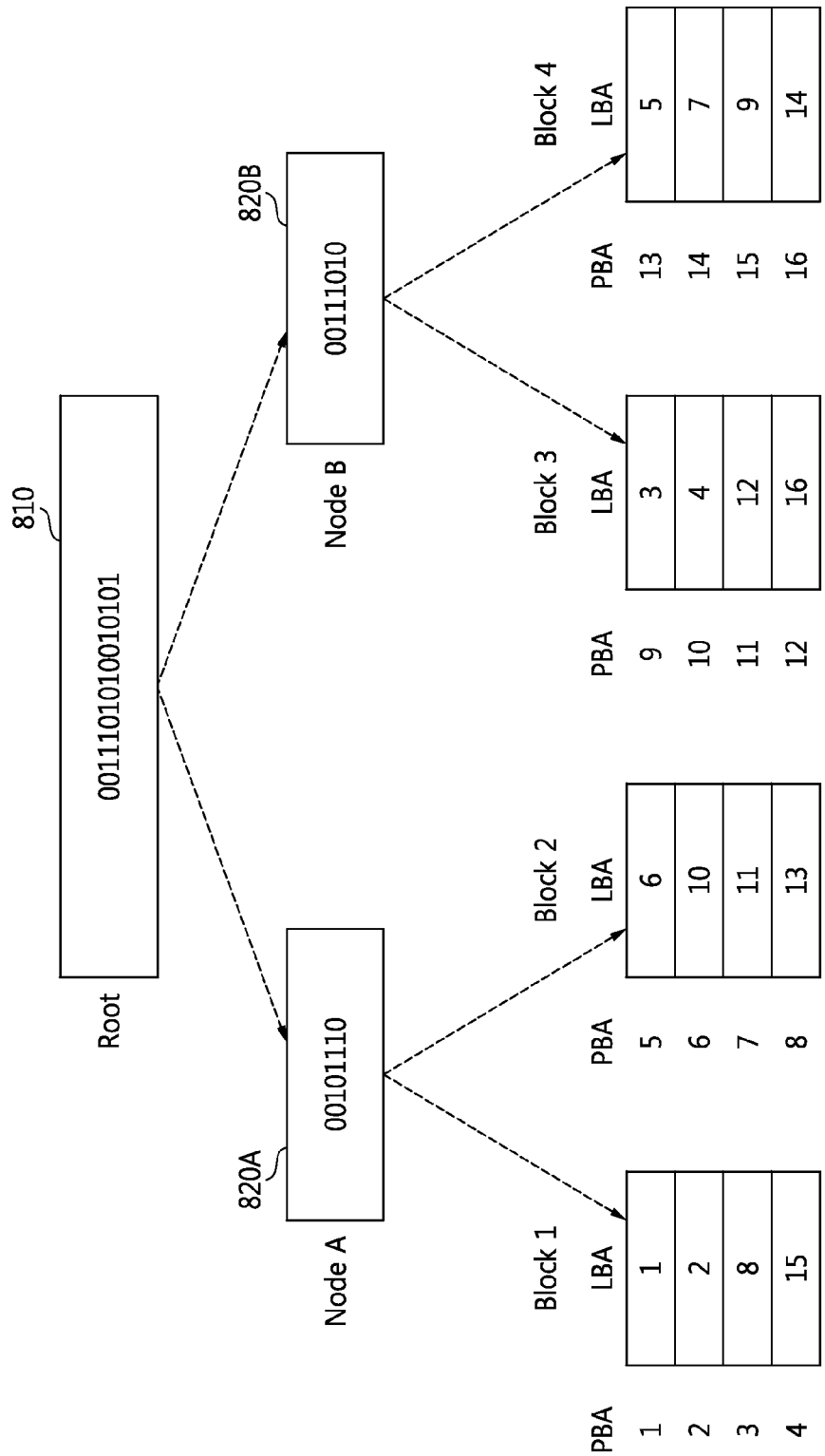

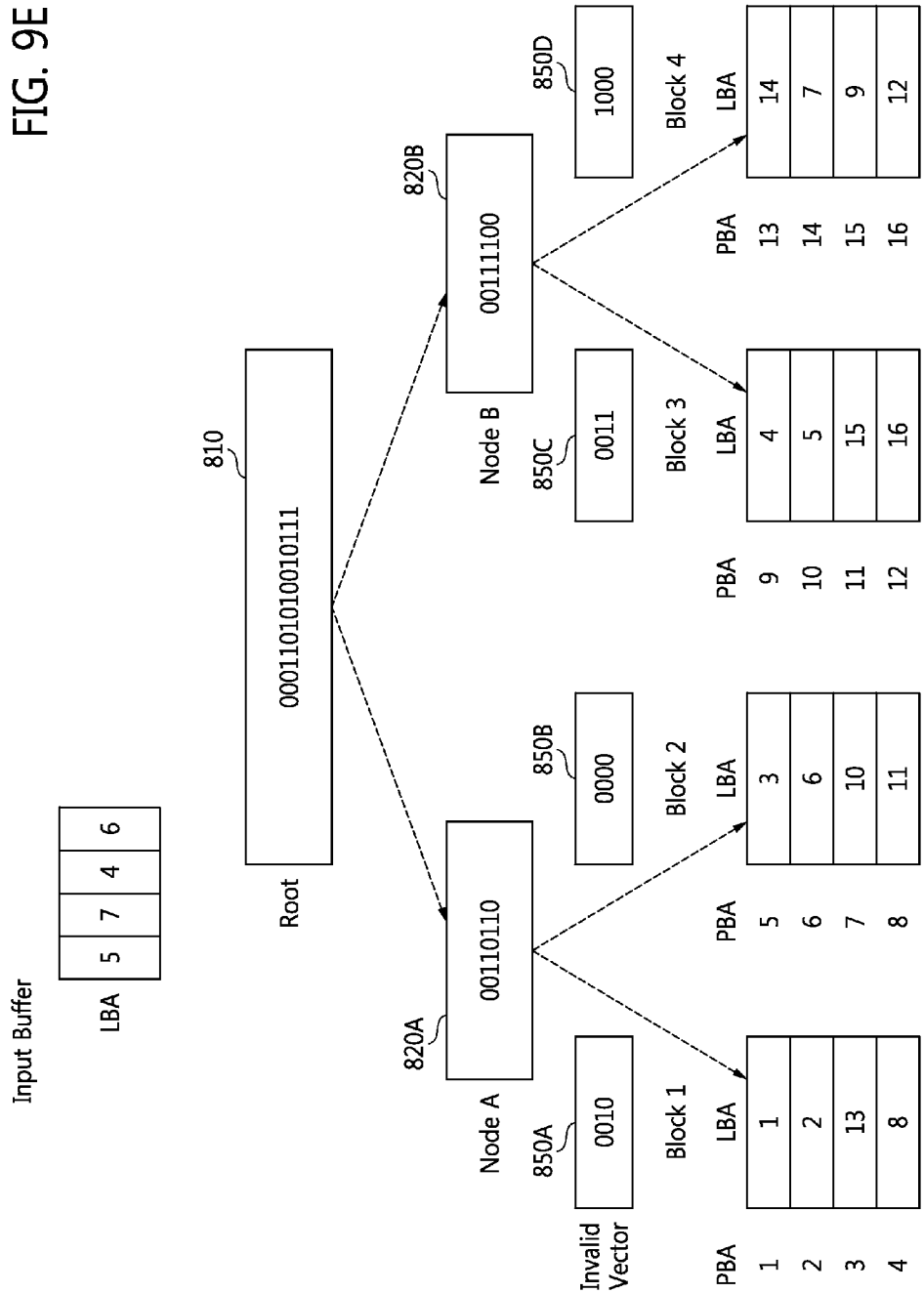

NONVOLATILE MEMORY DEVICES AND METHODS OF CONTROLLING THE SAME

BACKGROUND

A volatile memory device loses its stored data when its power supply is interrupted. Examples of a volatile memory device include a static RAM (SRAM), a dynamic RAM (DRAM), a synchronous DRAM (SDRAM), etc. A nonvolatile memory device retains its stored data even when its power supply is interrupted. Examples of a nonvolatile memory device include a read only memory (ROM), a programmable ROM (PROM), an electrically programmable ROM (EPROM), an electrically erasable programmable ROM (EEPROM), a flash memory device, a phase-change RAM (PRAM), a magnetic RAM (MRAM), a resistive RAM (RRAM), a ferroelectric RAM (FRAM), etc.

Flash memory devices generally having a flash translation layer (FTL) which maps a logical address into a physical address of the flash memory device.

SUMMARY

Example embodiments provide methods and/or apparatuses for controlling nonvolatile memory devices. In at least some example embodiments, pages are written to the memory device in an ascending order according to their logical address. As a result, a number of bits per entry in the memory device is reduced.

At least one example embodiment discloses a method of controlling a nonvolatile memory device including a plurality of blocks, each block including a plurality of physical pages. The method includes receiving a plurality of logical pages associated with a plurality of physical addresses, respectively and storing the plurality of logical pages at the plurality of physical addresses according to a given order of logical addresses of the logical pages.

In an example embodiment, the method includes obtaining a directory, the directory enabling access to a corresponding physical address of each stored logical page and the directory providing the corresponding physical address using the stored logical page as an input.

In an example embodiment, the nonvolatile memory device includes physical clusters, each physical cluster including a set of the plurality of physical pages.

In an example embodiment, the obtaining includes storing a set of incoming logical pages in a temporary memory and storing the logical pages in an ascending order in a physical cluster.

In an example embodiment, the obtaining includes generating a tree structure having a plurality of nodes, each of the plurality of nodes representing a subset of the logical addresses of logical pages.

In an example embodiment, the plurality of nodes include a plurality of non-leaf nodes, each of the non-leaf nodes having children nodes, an aggregation of the represented content of the children nodes of an associated non-leaf node is equal to the content of the associated non-leaf node.

In an example embodiment, each node of the plurality of nodes includes a sequence of symbols, each symbol corresponding to a logical page.

In an example embodiment, an order of the symbols in the non-leaf nodes determines the location of the corresponding logical pages within their corresponding children nodes.

In an example embodiment, an order of the symbols in the leaf nodes determines a location of the corresponding logical pages within the physical cluster.

In an example embodiment, each node comprises a second information layer, the second information layer including a set of integers, each of the set of integers is an order of one of the symbols in the non-leaf node, the one of the symbols belonging to a subset of the symbols belonging to the non-leaf node.

In an example embodiment, the symbols are binary.

In an example embodiment, the plurality of nodes include a plurality of leaf-nodes, the method further including decoding information associated with the plurality of leaf-nodes from the plurality of non-leaf nodes, each of the plurality of leaf-nodes corresponding to a physical cluster, the physical cluster including a set of the plurality of physical pages.

In an example embodiment, the symbols' alphabet is binary, 0-1, and each node comprises a sequence of the form $[x_1, \ldots, x_n]$, such that for every $i=1, 2 \ldots, n$: $x_i=0$, or $x_i=1$, and wherein if a node is not a leaf, then for every $i=1, 2 \ldots, n$, if $x_i=0$ then the logical page corresponding to $x_i$ goes to the left-child of the said node and its location within the left child is $i-(x_1+\ldots+x_i)$, and if $x_i=1$ then the logical page corresponding to $x_i$ goes to the right-child of the said node its location within the right-child is $(x_1+\ldots+x_i)$.

In an example embodiment, the method includes integer constant $s \geq 2$ such that the symbols' alphabet is binary, $0, 1, \ldots, s-1$ and each node comprises a sequence of the form $[x_1, \ldots, x_n]$, such that for every $i=1, 2 \ldots, n$: $x_i \in \{0, \ldots, s-1\}$, and wherein if a node is not a leaf, then for every $i=1, 2 \ldots, n$, setting $t=x_i$, the logical page corresponding to $x_i$ goes to the t-child of the said node and its location within that said child is $|\{j \leq i: x_j = x_i\}|$.

In an example embodiment, the set of logical pages is subdivided to subsets, including (a) per each said subset a sub-tree directory is constructed and stored and (b) the sub-tree directories are ordered by a fixed order.

In an example embodiment, the incoming pages are subdivided into subsets according to a given criteria, e.g., a hash value, wherein each subset is stored separate section of the device.

At least one example embodiment discloses a method of controlling a nonvolatile memory device including a plurality of blocks, each block including a plurality of physical pages. The method includes receiving a plurality of logical pages associated with a first plurality of logical addresses, respectively, and writing the first plurality of logical pages to the plurality physical addresses according to an ascending order of the logical addresses of the first plurality of logical pages.

In an example embodiment, the writing writes the first plurality of logical pages such that the logical addresses are sorted in ascending order in each block.

In an example embodiment, the method further includes determining storing information based on the stored first plurality of logical pages, the storing information including root information associated with the plurality of physical pages and node information, the node information associated with subsets of the blocks.

In an example embodiment, the node information includes at least a first node information part, the first node information part associated with a first subset of blocks, the first node information part having a first number of first bits equal to a first number of physical pages in the first subset of blocks, the first bits corresponding to at least a first portion of the logical addresses.

In an example embodiment, the determining includes ordering the bits in the first node information part according to an ascending order of the logical addresses corresponding to the first bits.

In an example embodiment, the node information includes a second node information part, the second node information part associated with a second subset of blocks, the second node information part having a second number of second bits equal to a second number of physical pages in the second subset of blocks, the second bits corresponding to at least a second portion of the logical addresses.

In an example embodiment, the root information has a third number of third bits and positions of the third bits in the root information correspond to the logical addresses in the first and second portions of the logical address and indicate a location of the corresponding logical address.

In an example embodiment, the method further includes determining a victim block, determining at least one valid logical page of the plurality of logical pages in the victim block, writing the at least one valid logical page to a buffer and writing all valid logical pages in the buffer to the victim block based on an ascending order of logical addresses associated with the valid logical pages.

In an example embodiment, the method further includes updating the first node information part by switching positions of the first bits based on the writing all valid logical pages in the buffer.

In an example embodiment, the method further includes updating the storing information, the updating including determining a plurality of inaccessible pages, the inaccessible pages being a second plurality of logical pages, storing the inaccessible pages in a selected physical block of the plurality of blocks, the selected physical block including selected physical pages of the plurality of physical pages, and generating an invalid vector indicating which of the selected physical pages corresponds to the inaccessible pages.

In an example embodiment, the method further includes reading a selected one of the first plurality of logical pages based on the node information and the root information.

In an example embodiment, the reading reads the selected one of the first plurality of logical pages based on a bit position in the root information, the bit position corresponding to the logical address associated with the selected on of the first plurality of logical pages and indicating a physical location of the selected one of the first plurality of logical pages.

In an example embodiment, the reading reads the selected one of the first plurality of logical pages based on a bit position in the node information.

In an example embodiment, n $\log_2$ (n/K) bits are used, where n is a number of the plurality of physical pages and K is a size of a buffer for the nonvolatile memory device.

In an example embodiment, the writing is independent of an order of receiving the first plurality of logical pages.

In an example embodiment, the nonvolatile memory is a NAND flash device.

At least one example embodiment discloses a memory system including a nonvolatile memory device including a plurality of blocks, each block including a plurality of physical pages and a memory controller configured to receive a plurality of logical pages associated with a plurality of physical addresses, respectively and store the plurality of logical pages at the plurality of physical addresses according to a given order of logical addresses of the logical pages.

In an example embodiment, the memory controller is configured to obtain a directory, the directory enabling access to a corresponding physical address of each stored logical page and the directory providing the corresponding physical address using the stored logical page as an input.

In an example embodiment, the nonvolatile memory device includes physical clusters, each physical cluster including a set of the plurality of physical pages.

In an example embodiment, the memory controller is configured to store a set of incoming logical pages in a temporary memory and store the logical pages in an ascending order in a physical cluster.

In an example embodiment, the memory controller is configured to generate a tree structure having a plurality of nodes, each of the plurality of nodes representing a subset of the logical addresses of logical pages.

In an example embodiment, the plurality of nodes include a plurality of non-leaf nodes, each of the non-leaf nodes having children nodes, an aggregation of the represented content of the children nodes of an associated non-leaf node is equal to the content of the associated non-leaf node.

In an example embodiment, each node of the plurality of nodes includes a sequence of symbols, each symbol corresponding to a logical page.

In an example embodiment, an order of the symbols in the non-leaf nodes determines the location of the corresponding logical pages within their corresponding children nodes.

In an example embodiment, an order of the symbols in the leaf nodes determines a location of the corresponding logical pages within the physical cluster.

In an example embodiment, each node comprises a second information layer, the second information layer including a set of integers, each of the set of integers is an order of one of the symbols in the non-leaf node, the one of the symbols belonging to a subset of the symbols belonging to the non-leaf node.

In an example embodiment, the symbols are binary.

In an example embodiment, the plurality of nodes include a plurality of leaf-nodes, and the memory controller is configured to decode information associated with the plurality of leaf-nodes from the plurality of non-leaf nodes, each of the plurality of leaf-nodes corresponding to a physical cluster, the physical cluster including a set of the plurality of physical pages.

At least one example embodiment discloses a memory system including a nonvolatile memory device including a plurality of blocks, each block including a plurality of physical pages and a memory controller configured to receive a plurality of logical pages associated with a first plurality of logical addresses, respectively, and write the first plurality of logical pages to the plurality physical addresses according to an ascending order of the logical addresses of the first plurality of logical pages.

In an example embodiment, the nonvolatile memory device is configured to store the first plurality of logical pages such that the logical addresses are sorted in ascending order in each block.

In an example embodiment, the memory controller is configured to determine storing information based on the stored first plurality of logical pages, the storing information including root information associated with the plurality of physical pages and node information, the node information associated with subsets of the blocks.

In an example embodiment, the node information includes at least a first node information part, the first node information part associated with a first subset of blocks, the first node information part having a first number of first bits equal to a first number of physical pages in the first subset of blocks, the first bits corresponding to at least a first portion of the logical addresses.

In an example embodiment, the memory controller is configured to order the bits in the first node information part according to an ascending order of the logical addresses corresponding to the first bits.

In an example embodiment, the node information includes a second node information part, the second node information part associated with a second subset of blocks, the second node information part having a second number of second bits equal to a second number of physical pages in the second subset of blocks, the second bits corresponding to at least a second portion of the logical addresses.

In an example embodiment, the root information has a third number of third bits and positions of the third bits in the root information correspond to the logical addresses in the first and second portions of the logical address and indicate a location of the corresponding logical address.

In an example embodiment, the memory controller is configured to determine a victim block, determine at least one valid logical page of the plurality of logical pages in the victim block, write the at least one valid logical page to a buffer and write all valid logical pages in the buffer to the victim block based on an ascending order of logical addresses associated with the valid logical pages.

In an example embodiment, the memory controller is configured to update the first node information part by switching positions of the first bits based on the writing all valid logical pages in the buffer.

In an example embodiment, the memory controller is configured to determine a plurality of inaccessible pages, the inaccessible pages being a second plurality of logical pages, store the inaccessible pages in a selected physical block of the plurality of blocks, the selected physical block including selected physical pages of the plurality of physical pages, and generate an invalid vector indicating which of the selected physical pages corresponds to the inaccessible pages.

In an example embodiment, the memory controller is configured to read a selected one of the first plurality of logical pages based on the node information and the root information.

In an example embodiment, the memory controller is configured to read the selected one of the first plurality of logical pages based on a bit position in the root information, the bit position corresponding to the logical address associated with the selected on of the first plurality of logical pages and indicating a physical location of the selected one of the first plurality of logical pages.

In an example embodiment, the memory controller is configured to read the selected one of the first plurality of logical pages based on a bit position in the node information.

In an example embodiment, n $\log_2$ (n/K) bits are used, where n is a number of the plurality of physical pages and K is a size of a buffer for the nonvolatile memory device.

In an example embodiment, the memory controller is configured to write the first plurality of logical pages independent of an order of receiving the first plurality of logical pages.

In an example embodiment, the nonvolatile memory is a NAND flash device.

BRIEF DESCRIPTION OF THE DRAWINGS

Example embodiments will become more appreciable through the description of the drawings in which:

FIG. 7 illustrates an example of the method shown in FIG. 6;

FIG. 8 illustrates an example of storing information according to an example embodiment;

FIGS. 9A-9G illustrate an example embodiment of updating a flash translation layer (FTL) including root information and node information;

DETAILED DESCRIPTION

Figure 1:
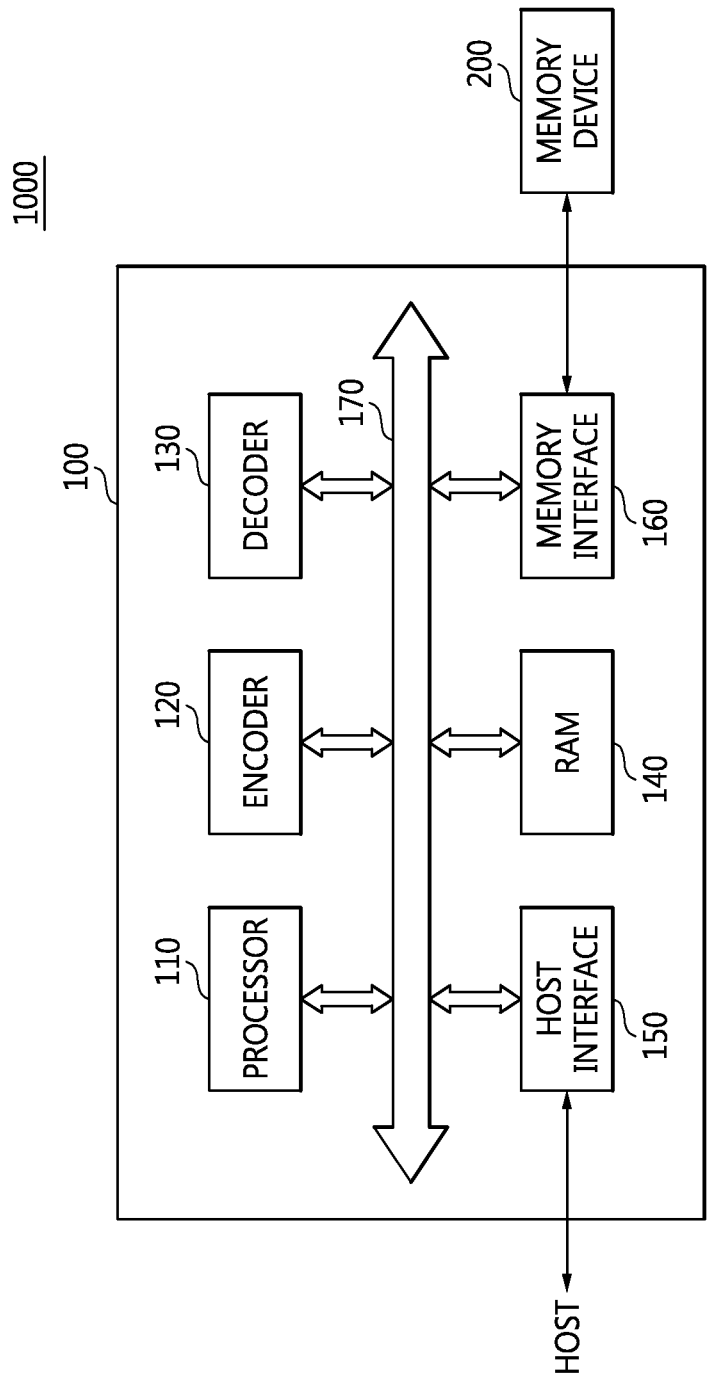
FIG. 1 is a block diagram of a memory system according to an example embodiment.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., nonvolatile memories universal flash memories, universal flash memory controllers, nonvolatile memories and memory controllers, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 is a block diagram of a memory system 1000 according to an example embodiment of inventive concepts.

As shown in FIG. 1, the memory system 1000 includes a memory controller 100 and a memory device 200. The controller 100 may be hardware, firmware, hardware executing software or any combination thereof. When the device controller 100 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the device controller 100, such as a processor 110. CPUs, DSPs, ASICs and FPGAs may generally be referred to as processors and/or microprocessors.

In the event that the controller 100 is a processor executing software, the processor is configured as special purpose machine to execute the software to perform the functions of the controller 100. In such an embodiment, the controller 100 may include one or more Central Processing Units (CPUs), digital signal processors (DSPs), application-specific-integrated-circuits (ASICs), field programmable gate arrays (FPGAs) computers.

The memory device 200 may be a non-volatile memory device. For example, the memory device 200 may be a flash memory device, a phase change random access memory (PRAM), a ferroelectric RAM (FRAM), or a magnetic RAM (MRAM) device. The memory device 200 may be configured to include at least one non-volatile memory device and at least one volatile memory device, or at least two or more kinds of non-volatile memory devices.

In addition, the memory device 200 may be configured as a single flash memory chip, or multiple flash memory chips. The flash memory chips may be NAND flash memory chips.

The memory controller 100 includes a processor 110, an encoder 120, a decoder 130, a RAM 140, a host interface 150, a memory interface 160, and a bus 170.

The processor 110 is electrically connected to the encoder 120, the decoder 130, the RAM 140, the host interface 150, and the memory interface 160 via the bus 170.

The bus 170 denotes a transfer path through which information is transferred between elements of the memory controller 100.

The processor 110 controls overall operations of the memory system 1000. In particular, the processor 110 reads commands transmitted from a host and controls the memory system 1000 to perform an operation according to the read result.

The processor 110 provides the memory device 200 with a read command and an address during a reading operation, and provides the memory device 200 with a write command, an address, and an encoded codeword during a writing operation. In addition, the processor 110 converts a logical address received from the host into a physical page address by using metadata stored in the RAM 140.

The RAM 140 temporarily stores data transmitted from the host and data generated by the processor 110, or data read out from the memory device 200. Also, the RAM 140 may store metadata read out from the memory device 200. The RAM 140 may be a DRAM or an SRAM.

Metadata is information generated by the memory system 1000 in order to manage the memory device 200. The metadata, that is, managing information, includes mapping table information that is used to convert logical addresses into physical page addresses of the memory device 200. For example, the metadata may include page mapping table information that is necessary to perform an address mapping process per page unit. Also, the metadata may include information for managing storages of the memory device 200.

The host interface 150 includes a protocol for data exchange with a host connected to the memory device 200, and connects the memory device 200 and the host to each other. The host interface 150 may be realized as an advanced technology attachment (ATA) interface, a serial advanced technology attachment (SATA) interface, a parallel ATA (PATA) interface, a universal serial bus (USB) interface or a serial attached small (SAS) computer system interface, a small computer system interface (SCSI), embedded multimedia card (eMMC) interface, or a unix file system (UFS) interface. However, inventive concepts are not limited to the above examples. In particular, the host interface 150 may exchange commands, addresses, and data with the host according to control of the processor 110.

The memory interface 160 is electrically connected to the memory device 200. The memory interface 160 may support the interface with a NAND flash memory chip or a NOR flash memory chip. The memory interface 160 may be configured so that software and hardware interleaved operations may be selectively performed via a plurality of channels.

The processor 110 controls the memory system 1000 to read the metadata stored in the memory device 200 and store the metadata in the RAM 140, when an electric power is supplied to the memory system 1000A. The processor 110 controls the memory system 1000 to update the metadata stored in the RAM 140 according to an operation of generating metadata change in the memory device 200. In addition, the processor 110 controls the memory system 1000 to write the metadata stored in the RAM 140 in the memory device 200 before the memory system 1000 is turned off (POWER OFF).

The processor 110 controls the memory controller 100 to perform an encoding process of information words transmitted from the host in the encoder 120 during the writing operation, and to perform a decoding process of the data read from the memory device 200 in the decoder 130 during the reading operation.

Figure 2:
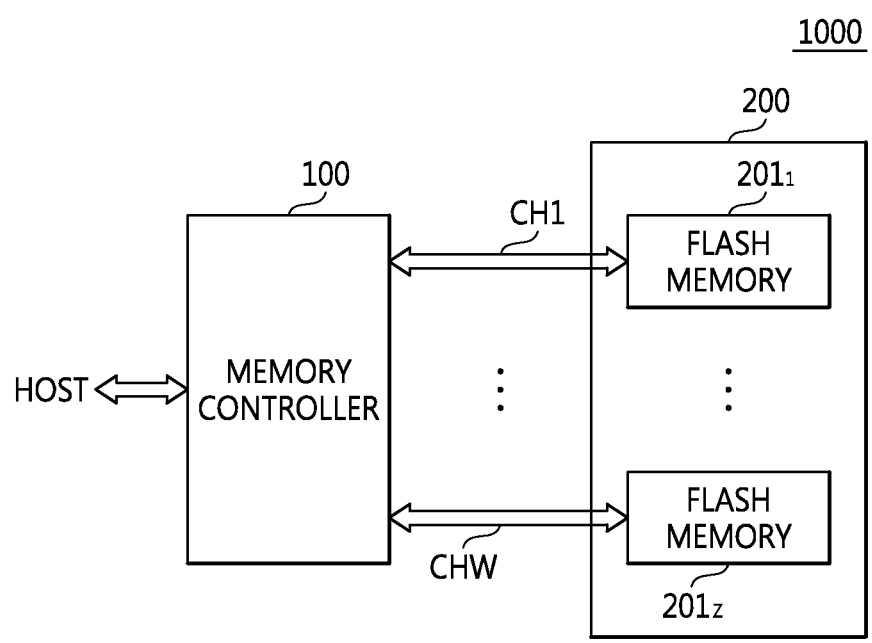
FIG. 2 is a block diagram of a memory system forming a plurality of channels by configuring a memory device shown in FIG. 1 with a plurality of memory chips.

FIG. 2 is a block diagram of a memory system 1000 forming a plurality of channels by configuring the memory device 200 shown in FIG. 1 with a plurality of memory chips.

Referring to FIG. 2, the memory device 200 includes a plurality of flash memory chips 201 and 203.

The memory system 1000 includes first through N-th channels CH1-CHN (N is a natural number) and each of the channels may include flash memory chips. The number of flash memory chips included in each of the channels may vary.

The memory controller 100 of FIG. 2 is substantially the same as the memory controller 100 of FIG. 1, and detailed descriptions thereof are not provided here.

A plurality of flash memory chips $201_1$-$201_w$ may be electrically connected to each of the channels CH1 through CHW. Each of the channels CH1 through CHW may denote an independent bus that may transmit/receive commands, addresses, and data to/from the corresponding flash chips 201, 202, and 203. The flash memory chips connected to different channels may operate independently from each other. The plurality of flash memory chips 201, 202, and 203 connected to the channels CH1 through CHW may form a plurality of ways. Z number of flash memory chips may be connected to Z ways formed with respect to each of the channels CH1 through CHW.

For example, flash memory chips 201 may configure Z ways in the first channel CH1. Flash memory chips 201-1 through 201-Z may be connected respectively to the Z ways in the first channel CH1. Such relationships between the flash memory chips and the ways may be applied to the flash memory chips 202 and the flash memory chips 203.

The way is a unit for distinguishing the flash memory chips sharing the same channel. Each of the flash memory chips may be identified according to the channel number and the way number. It may be determined which flash memory chip performs the request provided from the host according to the logical address transmitted from the host.

Figure 3:
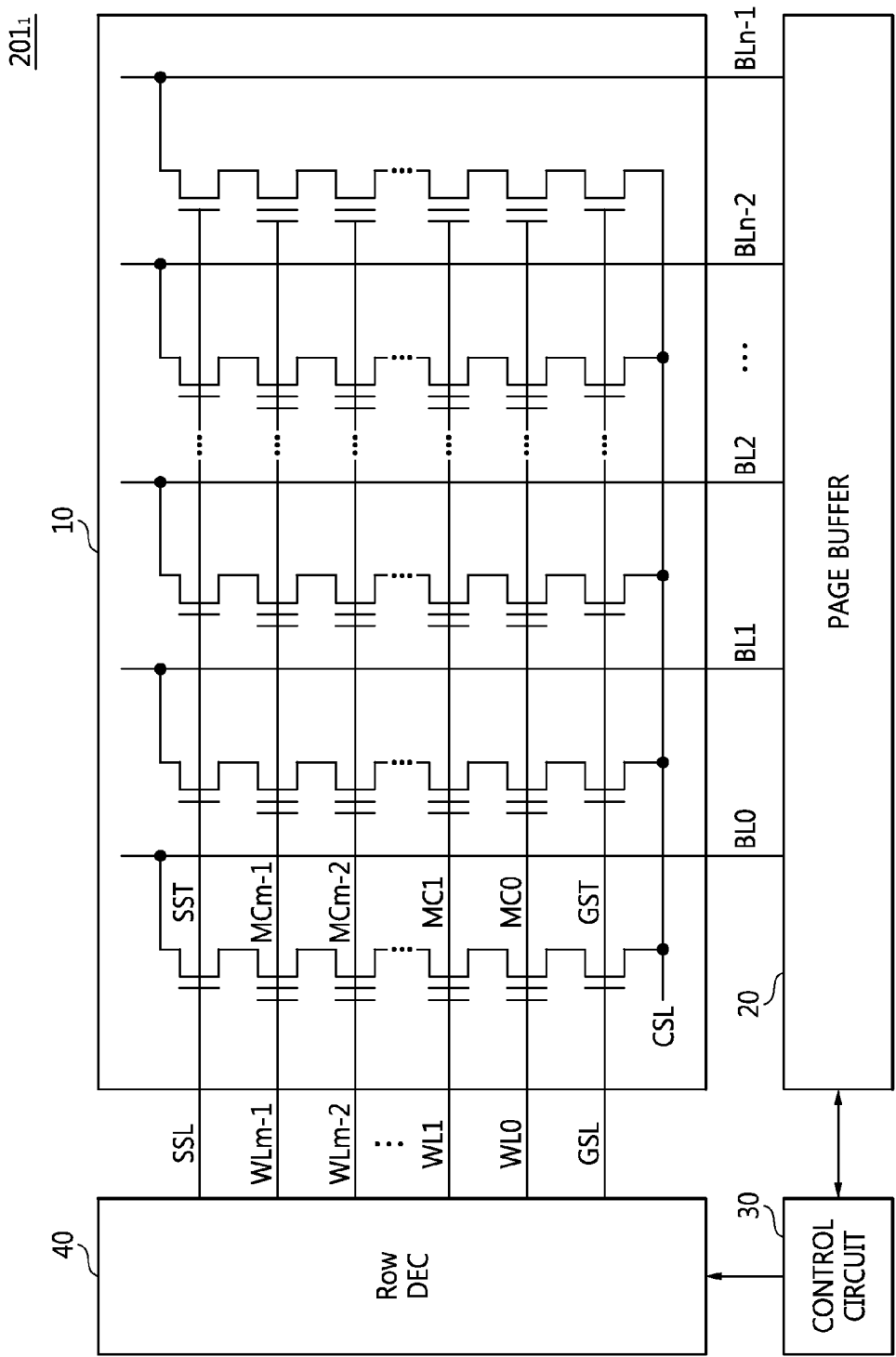
FIG. 3 is a diagram showing a circuit configuration of a flash memory chip according to an example embodiment.

FIG. 3 is a diagram showing a circuit configuration of one flash memory chip $201_1$ forming the memory device 200.

As shown in FIG. 3, the flash memory chip $201_1$ may include a cell array 10, a page buffer 20, a control circuit 30, and a row decoder 40.

Figure 4:
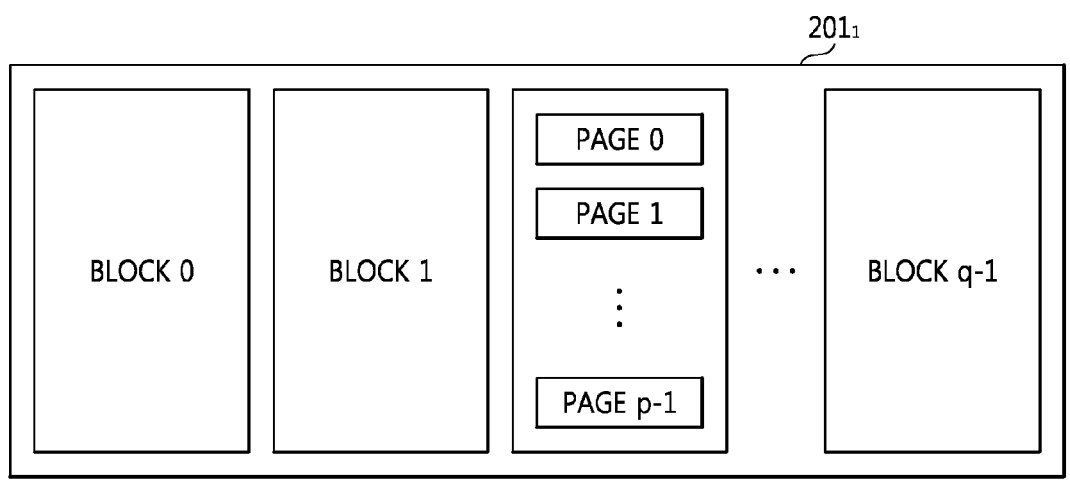
FIG. 4 illustrates a flash memory chip including a plurality of blocks according to an example embodiment.

The cell array 10 is an area in which data is written by applying a voltage to a transistor. The cell array 10 includes memory cells formed on points where word lines WL0 through WLm−1 and bit lines BL0 through BLn−1 cross each other. Here, m and n are natural numbers. In FIG. 4, only one memory block is shown; however, the cell array 10 may include a plurality of memory blocks. Each of the memory blocks includes a page corresponding to each of the word lines WL0 through WLm−1. In addition, each page may include a plurality of memory cells connected to the corresponding word line. The flash memory chip $201_1$ performs an erasing operation with respect to each memory block, and performs a programming operation or a reading operation with respect to each page.

The memory cell array 10 has a cell string structure. Each of cell strings includes a string selection transistor (SST) connected to a string selection line (SSL), a plurality of memory cells MC0 through MCm−1 respectively connected to the plurality of word lines WL0 through WLm−1, and a ground selection transistor (GST) connected to a ground selection line (GSL). Here, the SST is connected between the bit line and a string channel, and the GST is connected between the string channel and a common source line (CSL).

The page buffer 20 is connected to the cell array 10 via the plurality of bit lines BL0 through BLn−1. The page buffer 20 temporarily stores data that will be written in the memory cells connected to the selected word line, or the data read from the memory cells connected to the selected word line.

The control circuit 30 generates various voltages necessary to perform the programming operation or the reading operation, and the erasing operation, and controls overall operations of the flash memory chip $201_1$.

The row decoder 40 is connected to the cell array 10 via the SSL, the GSL, and the plurality of word lines WL0 through WLm-1. The row decoder 40 receives an address during the programming operation or the reading operation, and selects one of the word lines according to the input address. Here, the memory cells for performing the programming operation or the reading operation are connected to the selected word line.

Also, the row decoder 40 applies voltages that are necessary for the programming operation or the reading operation (for example, a programming voltage, a pass voltage, a reading voltage, a string selection voltage, and a ground selection voltage) to the selected word line, non-selected word lines, and the selection lines (SSL and GSL).

Each of the memory cells may store data of one bit or two or more bits. The memory cell storing the data of one bit may be referred to as a single level cell (SLC). In addition, the memory cell storing the data of two or more bits may be referred to as a multi-level cell (MLC). The SLC is in an erase state or a program state according to a threshold voltage thereof.

As shown in FIG. 4, the flash memory chip $201_1$ includes a plurality of blocks therein, and each of the blocks includes a plurality of pages.

In the flash memory chip $201_1$, the writing and reading of the data is performed per page unit, and an electric erasing is performed per block unit. In addition, the electric erasing operation of the block has to be performed before performing the writing operation. Accordingly, overwriting may not be possible.

In the memory device that is not capable of performing the overwriting, the user data may not be written in a physical area desired by the user. Therefore, when the host request to access in order to write or read data, an address conversion operation for converting the logical address representing an area that is requested to write or read data into a physical page address representing a physical area actually storing the data or will store the data is necessary.

Figure 5:
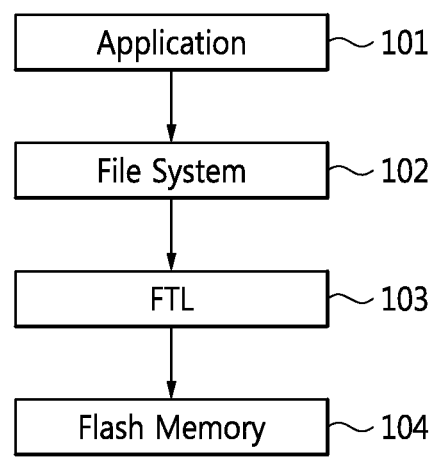
FIG. 5 illustrates a diagram layers of the memory system shown in FIG. 1.

Referring to FIG. 5, the memory system 1000 has a hierarchical structure including an application layer 101, a file system layer 102, a flash translation layer (FTL) 103, and a flash memory layer 104.

The application layer 101 denotes firmware processing data in response to the user input from the host. In the application layer 101, the user data is processed in response to the user input, and a command for storing the processed user data in a flash memory chip is transmitted to the file system layer 102. The application 101 indicates various application programs being driven in an external device (e.g., a host, application processor, etc.). For example, the application 101 includes various computing programs such as a text editor, a web browser, an image player, a game program, etc.

In the file system layer 102, a logical address in which the user data will be stored is allocated in response to the command transmitted from the application layer 101. A file allocation table system or NTFS may be used as the file system in the file system layer 102. For example, the file system 102 may include a file allocation table (FAT), a FAT32, a NT File system (NTFS), a hierarchical file system (HFS), a journaled file system2 (JSF2), a XFS, an on-disk structure-5 (ODS-5), a UDF, a ZFS, a unix file system (UFS), ext2, ext3, ext4, ReiserFS, Reiser4, ISO, 9660, Gnome, VFS, EFS or WinFS.

The FTL 103 can provide an interface between the host and the nonvolatile memory device 120. In the FTL 103, the logical address transmitted from the file system layer 102 is converted to the physical page address for performing the writing/reading operations in the flash memory chip. In the FTL 103, the logical address may be converted into the physical page address by using mapping information included in the metadata. The address conversion operation in the FTL 103 may be performed by the processor 110 of the memory controller 100, as will be described below.

In the flash memory layer 104, control signals for storing or reading data by accessing the physical page address converted from the logical address are generated.

In an example embodiment, the FTL 103 may be stored in the RAM 140. Example embodiments described below are described using page level FTL where the mapping granularity is a page (a sector). The term "page" may refer to a reading/writing unit that can be 4 KB or 8 KB, for example. It should be understood that page is not limited to being a data size of 4 KB or 8 KB.

In page level FTL, a logical page is mapped into a physical page. Each logical page is represented by an entry in the FTL 103. If the total number of pages in the memory device 200 is n, then the size of each entry of the FTL is $\log_2$ (n) bits.

Therefore, the total size of an FTL table is n $\log_2$ (n). Consequently, for a device of size 64 Gb (bits), the size of the FTL table is 20 Mb. Example embodiments reduce the size of the FTL table by writing pages to the memory device in an ascending or descending order according to their logical address. Consequently, the size of the RAM 140 may be reduced.

While example embodiments are described by writing pages in the ascending order, it is understood that the methods described herein may be implemented using the descending order or another defined order.

Figure 6:
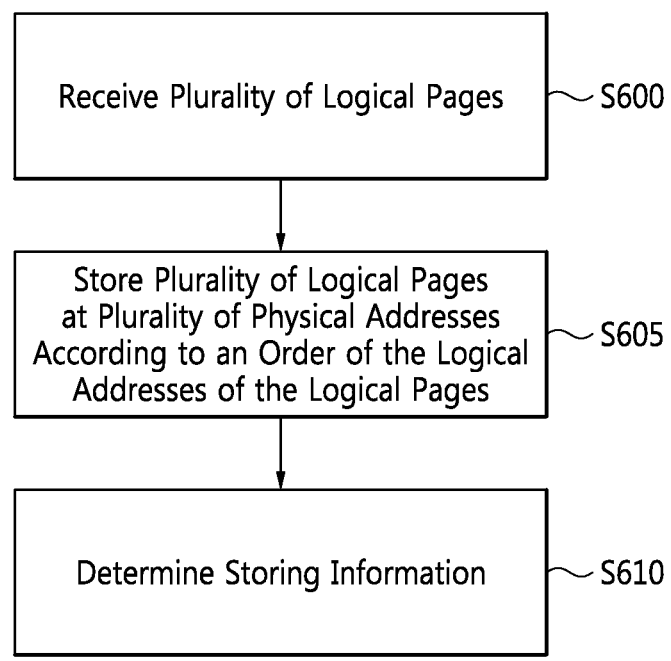
FIG. 6 illustrates a method of controlling a nonvolatile memory device according to an example embodiment.

FIG. 6 illustrates a method of controlling a nonvolatile memory device according to an example embodiment. The method may be implemented by the controller 100 and the memory device may be the memory device 200. While the writing and reading operations are described in terms of pages. It should be understood, that the unit for writing and reading is not limited to pages.

At S600, the controller 100 receives a first plurality of logical pages to write to the memory device 200 from a host. The first plurality of logical pages have logical addresses, respectively.

At S605, the controller 100 writes the first plurality of logical pages in physical address according to an ascending order of the logical addresses of the first plurality of logical pages using the FTL 103. As a result, the memory device 200 stores the first plurality of logical pages such that the logical addresses are sorted in an ascending order in a physical cluster, where the physical cluster is a set of physical pages. As described above, the FTL 103 the logical address transmitted from the file system layer 102 is converted to the physical page address for performing the writing/reading operations in the flash memory chip. The controller 110

FIG. 7 illustrates an example of the method described in FIG. 6.

The figure shows a NAND with 8 pages and buffer of size 4 pages. Assume that the block size is 4 pages. The numbers indicate the logical addresses of the pages. The buffer (e.g., synchronous random access memory (SRAM) and/or dynamic random access memory (DRAM)) temporarily stores data to be stored in the nonvolatile memory and/or data read from the nonvolatile memory. The buffer memory may be implemented by a volatile and/or nonvolatile memory. The buffer memory may be implemented in the RAM 140, but is not limited thereto. In general, the buffer memory may be implemented in any type of memory, for example, NAND flash.

Before the update, the memory device 200 stores 4 pages 1, 2, 5, 7.

The buffer stores pages having logical addresses 3, 4, 6 and 8. The pages at the buffer memory are sorted according to their logical addresses by the processor 110. The pages may be written in the buffer in any order—sorted or unsorted. There may be an additional external data structure that specifies the order of the indices of the pages according to their logical addresses.

The memory controller and, more specifically, the processor 110, then writes the pages stored in the buffer to the memory device address according to an ascending order of the logical addresses of the first plurality of logical pages using the FTL 103. As shown, the controller 110 stores the logical page corresponding to the logical address 3, first, then the logical page corresponding to the logical address 4, then the logical page corresponding to the logical address 6 and, lastly, the logical page corresponding to the logical address 8.

Using 8 total pages and 4 page pages per block, for regular page to page, FTL the size of the FTL is 24 bits (8*3), where 3 is obtained from $\log_2 (8)$. In an example embodiment, the size of the FTL is 8 bits (8*log(8/4), where 8 is the total number of pages), which results in a 66% reduction the FTL size.

In an example of 16 pages (4 pages per block) regular page level FTL requires 64 bits, whereas the FTL according to an example embodiment uses 32 bits (reduction of 50%).

Referring back to FIG. 6, the controller 100, using the FTL 103, may determine storing information based on the stored logical pages. The storing information may include root information associated with the plurality of physical pages and node information. The node information being associated with subsets of the blocks. The storing information may be a tree-like structure that represents at least a portion of the FTL directory such that each node in the tree includes logical pages that are assigned to a subset of physical clusters.

The FTL according to an example embodiment maps the logical addresses into physical addresses. The tree structure is generated either by hardware or by software in the controller of the device.

FIG. 8 illustrates an example of the storing information generated by the controller 100 and stored in the RAM 140.

In the example of FIG. 8, there are four blocks and four pages per block, thereby having sixteen total pages. For each block, block 1, block 2, block 3 and block 4, the FTL maps the logical address (LBA) to the physical address (PBA) For each block, the logical addresses of the pages are sorted in ascending order.

As shown in FIG. 8, the FTL may be represented by a binary tree having root information 810 and node information 820A and 820B, associated with nodes Node A and Node B, respectively. While only two nodes are illustrated in the example of FIG. 8, example embodiments are not limited thereto. There may be more nodes than two in the tree and the FTL includes the information of all nodes of the tree.

The node information 820A and 820B in each node includes a code of symbols such that each symbol corresponds to a logical sector and its location with the node information corresponds to its assignment in the set of physical clusters (pages) that are associated to that node. In the example of FIG. 8, the symbols are binary.

Each node A and B in the tree corresponds to the pages in the blocks below it. Consequently, node A is associated with the pages in blocks 1 and 2 and node B is associated with the pages in block 3 and 4.

The root of the tree is associated with all pages in the memory device 200. It should be understood, that the number of pages maybe greater than or less than sixteen. However, for the sake of simplicity, sixteen pages is used to describe an example embodiment as opposed to a larger number of pages.

Each pair of blocks has a leaf node associated with them.

In the example of FIG. 8, the code of symbols associated with the nodes A and B are binary codes. For node A, the node information 820A is "00101110". For node B, the node information 820B is "00111010".

The number of bits in the node information is equal to the number of pages associated with the node. Node A has 8 pages associated with it and, consequently, the node information 820A has 8 bits.

In the node information 820A and 820B, the controller 100 writes a bit 0 to mean left side of the node and bit 1 to mean right side of the node. The bits in each node information 820A and 820B are ordered according to the index of logical addresses.

For example, the pages below node A, according to the order of their logical addresses are 1, 2, 6, 8, 10, 11, 13 and 15. The controller 100 writes the first bit in the code of node A as 0 since the smallest page below node A is logical page 1 and it is on the left side, in block 1. The controller 100 writes the third bit as 1, since the third smallest page below node A is logical address 6 and it is on the right side of node A, in block 2.

The code information 810 is "0011100010010101". Since the root consists of all the pages in the memory device 200, the controller generates the code information such that the bit in position i in the code of the root represents the location of page i, with respect to the root. For example, the bit in position 5 of the code of the root is 1 and the logical page corresponding to logical address 5 is on the right side of the root, in block 4.

Read

Consequently, to read the physical page of a logical page, the controller 100 starts with the code information 810 of the FTL. For example, the bit in position 5 of the code information 810 is 1 and, therefore, the controller 100 knows that the logical page corresponding to logical address 5 is on the right side of the root, block 3 or 4. Since the logical page corresponding to logical address 5 is on the right side, the controller 100 knows that there is a bit in the code of the node B that is associated with the logical page corresponding to logical address 5. In order to find the location of the bit in the code of the node B, the controller 100 analyzes root information 810. The controller 100 sums the bits in positions 1-5 of the root information "0011101010010101". The code in positions 1-5 is "00111". Thus, the controller 100 determines the sum to be 3.

Consequently, the bit in position 3 of the node information 820B of the node B is associated with the logical page corresponding to logical address 5. The bit in position 3 of the node information 820B is 1. Thus, the controller 100 determines that the logical page corresponding to logical address 5 is on the right side of the node B, in block 4.

Updating

The method shown in FIG. 6 may further include updating the root information and node information.

FIGS. 9A-9G illustrate an example embodiment of updating the FTL including the root information and the node information.

Figure 9A:
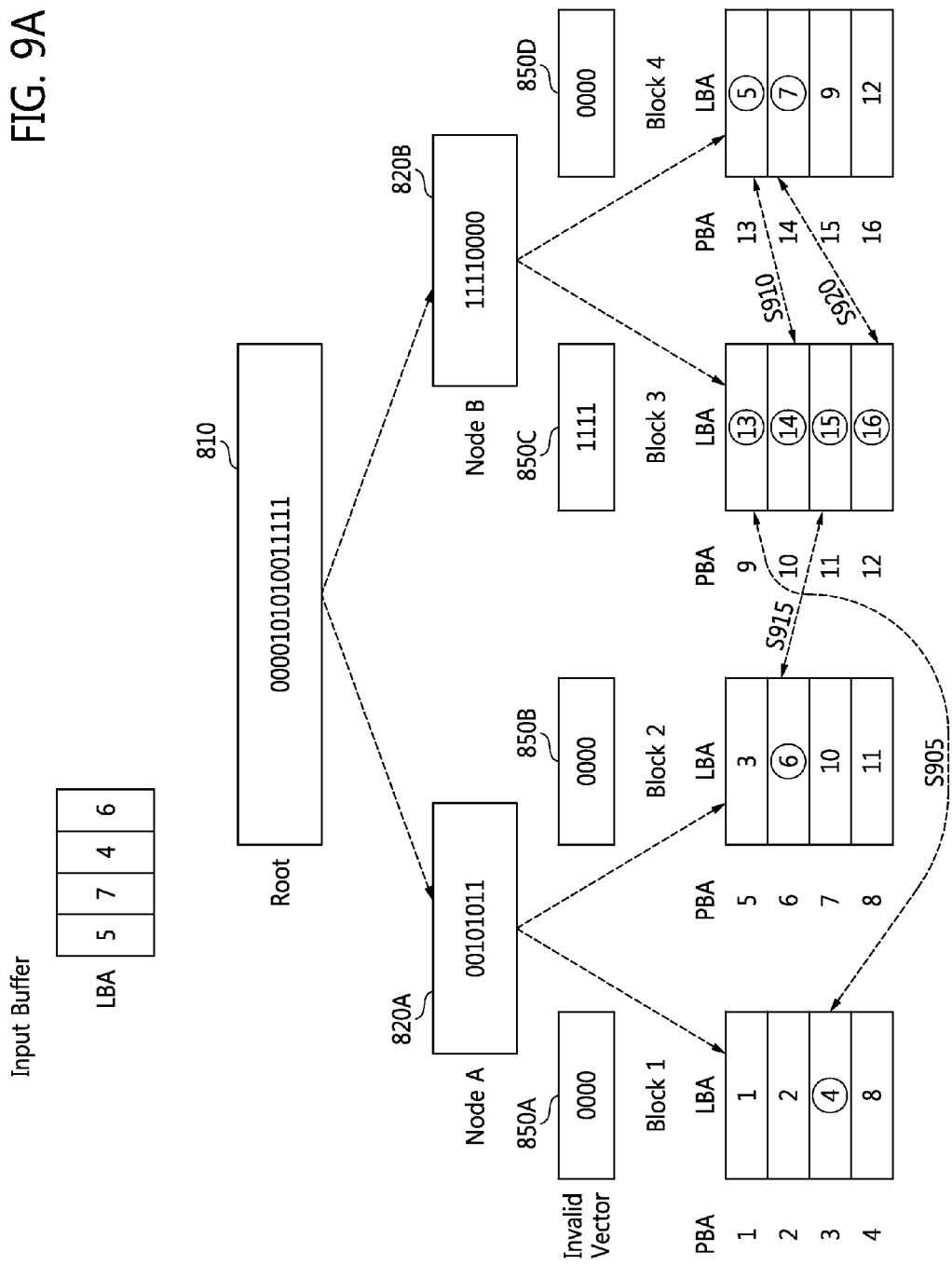

In the example shown in FIG. 9A, there is over-provisioning of 4 pages out of 16 pages. As a result, a user does not have access to pages corresponding to logical addresses 13-16. Since the pages corresponding to logical addresses 13-16 are not accessible to the user, the controller 100 assigns the pages corresponding to logical addresses 13-16 to a free block. A user may have a table in the file system that indicates which pages are valid or invalid. The controller may also hold a table that indicates which pages are valid or invalid.

The controller 100 generates an invalid vector for each block. Each bit in the invalid vector information 850A-850D corresponds to a physical page within the associated block. The bit indicates whether the corresponding physical page is valid or invalid For example, the vector of valid and invalid pages may be managed and known by the controller 100.

In the example shown in FIG. 9A, the bits of the vector corresponding to block 3 are turned on (i.e., "1"), since pages corresponding to logical addresses 13-16 are always invalid.

As shown, the input buffer stores pages corresponding to logical addresses 5, 7, 4 and 6. In accordance with an example embodiment, the controller 100 writes the pages in ascending order of the logical address. In other words, the controller 100 switches the page corresponding to logical address 13 with the page corresponding to logical address 4, the page corresponding to logical address 14 with the page corresponding to logical address 5, the page corresponding to logical address 15 with the page corresponding to logical address 6 and the page corresponding to logical address 16 with the page corresponding to logical address 7. The switching is performed logically for mapping purposes. There is no switching in the physical content of the pages. The mapping will be modified, and the pages in the input buffer written to block 3. In other words, the logical pages 4-7 end up in physical block 3. But, the content of the physical pages 3, 6, 13, 14 does not change. That is, physical page 3 will contain the content of logical page 4. Physical page 6 will contain the content of logical page 6. Physical page 13 will contain the content of logical page 5. Physical page 14 will contain the content of logical page 7.

At S905, the controller 100 switches the page corresponding to logical address 4 and the page corresponding to logical address 13, as shown in FIG. 9A. Because logical page 4 arrives from the host to the controller 100, the previous logical page 4 is invalid. The pages are then switched according to their order and because logical page 4 is the smallest logical address in the buffer, it is switched with the smallest logical address in block 3, which is 13.

Figure 9B:
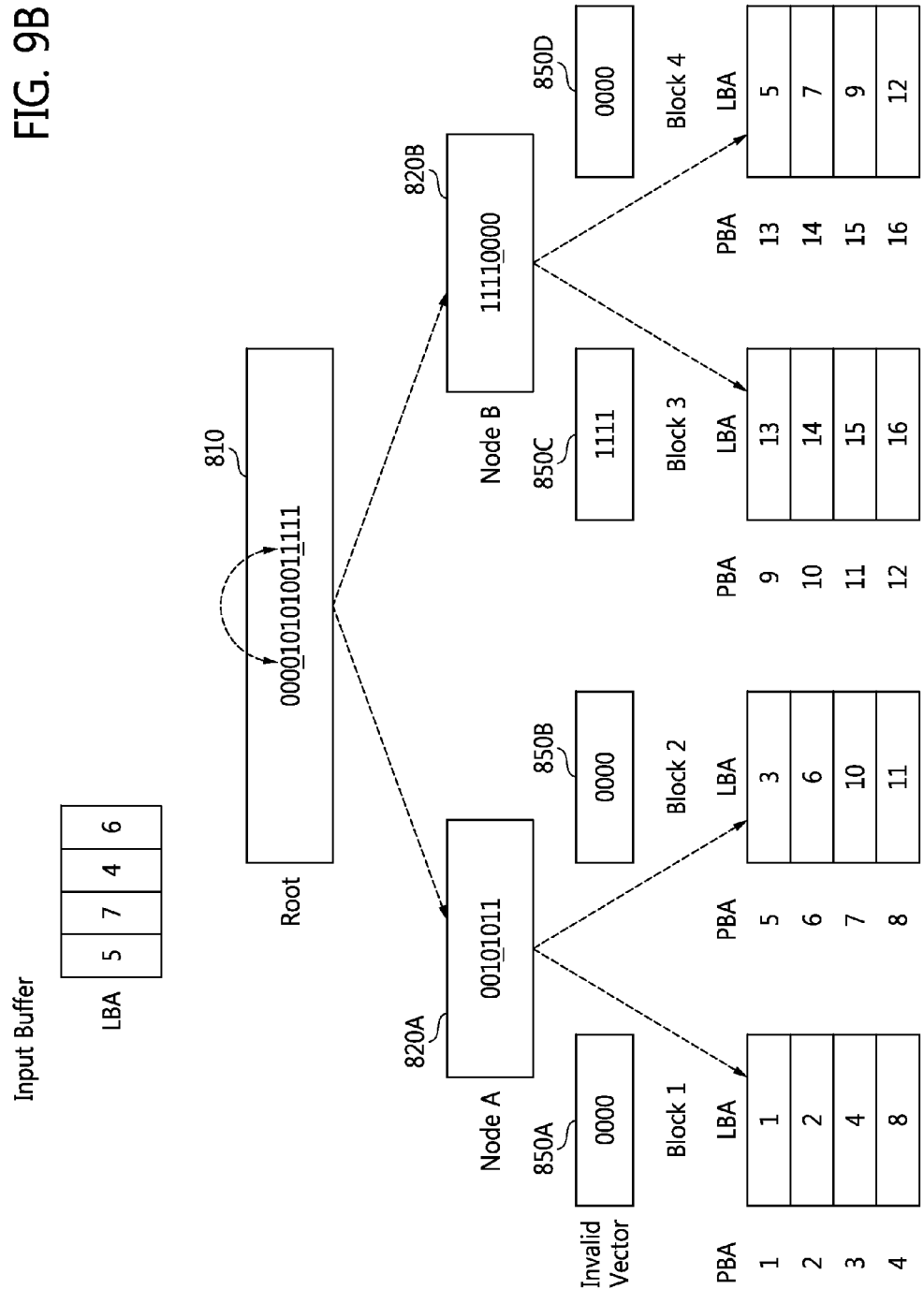
Figure 9C:
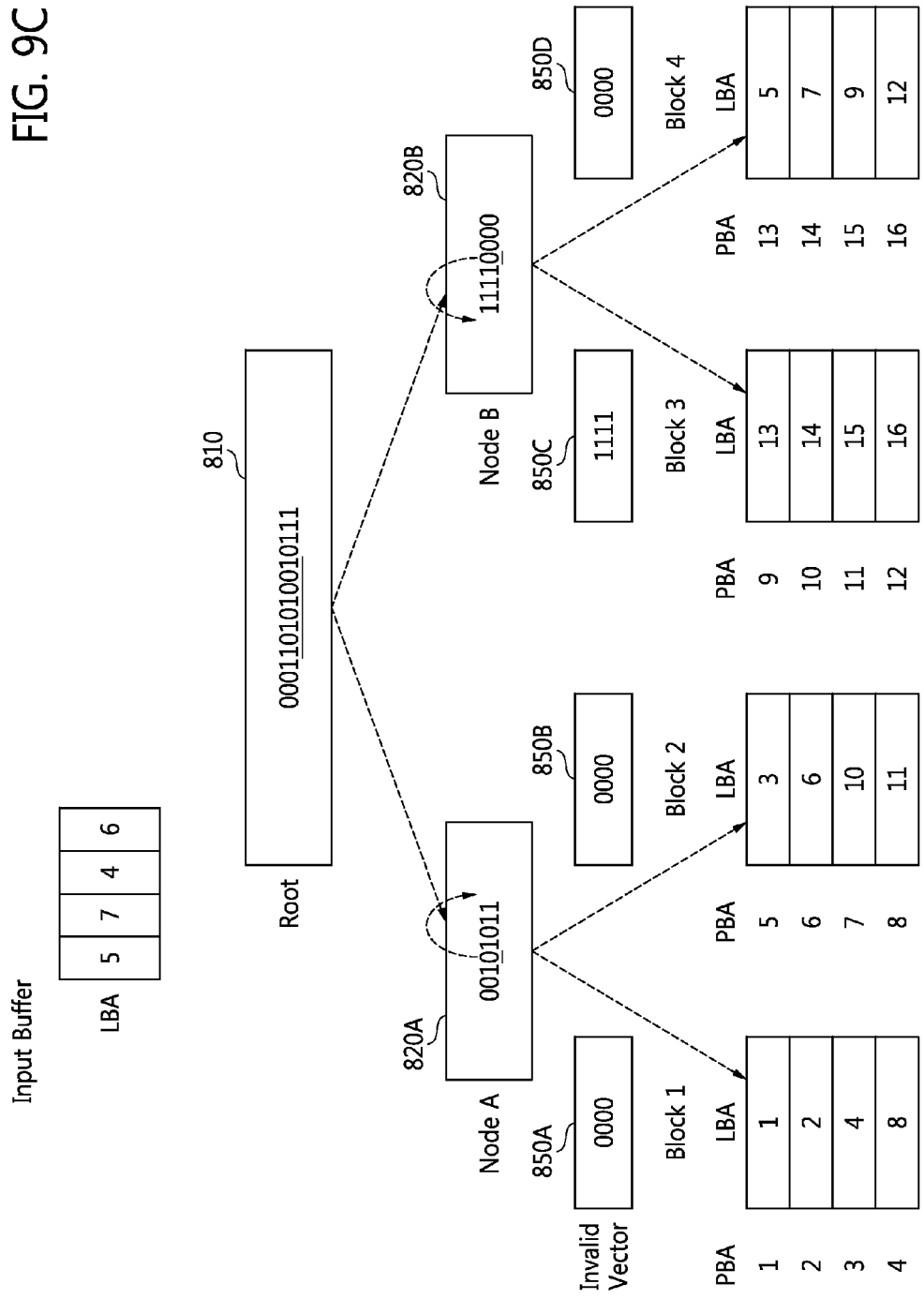
Figure 9D:
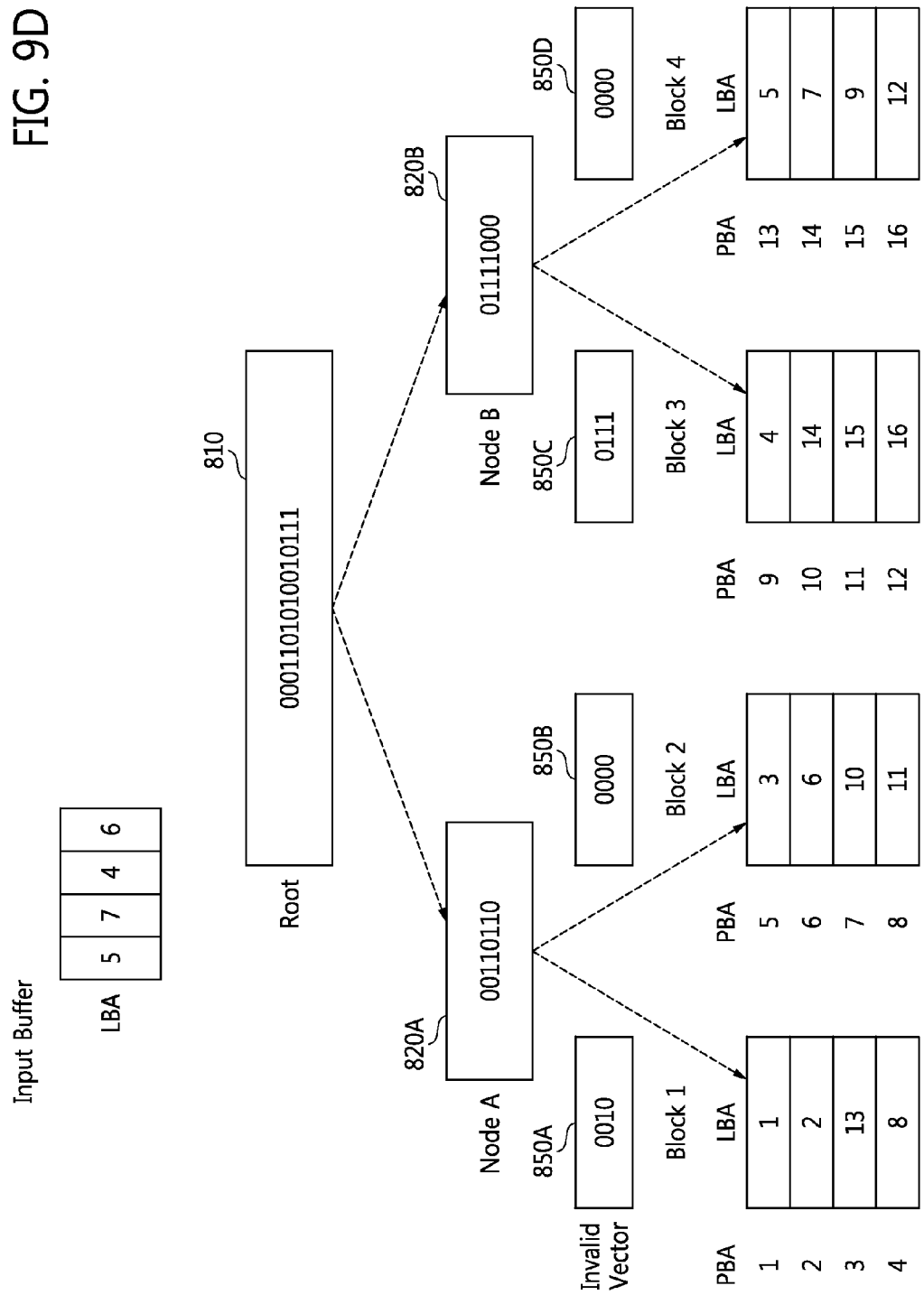

FIGS. 9B-9D illustrate an example embodiment of S905.

The controller 100 determines the lowest common ancestor of the two pages to be switched. In the example of FIG. 9B, the controller determines the lowest common ancestor of the page corresponding to logical address 4 and the page corresponding to logical address 13.

Since the page corresponding to logical address 4 is in block 1 and the page corresponding to logical address 13 is in block 3, the lowest common ancestor is the root node. The underlined bits in the code information 810 correspond to logical addresses 4 and 13. In the final mapping, the controller switches these bits.

The controller 100 then analyzes the path of the tree structure to logical address 4 and the path of the tree structure to logical address 13.

Since the bit in the root information 810 that corresponds to logical address 4 is 0, the controller 100 knows the page corresponding to logical address 4 is on the left side of the root. Since the bit in the root information 810 that corresponds to logical address 13 is 1, the controller 100 knows the page corresponding to logical address 13 is on the right side of the root.

The controller 100 then determines the bit in node information 820A that corresponds to logical address 4. In the root, the code in positions 1-4 is "0000".

Since there are 4 zeros, the controller 100 determines that in node A, the bit in position 4 of the node information 820A corresponds to the page corresponding to logical address 4. This bit is underlined in the node information 820A.

Similarly, the controller 100 determines the bit in node information 820B that corresponds to logical address 13. In the root, the code in positions 1-13 is "0000101010011".

Since there are 5 ones, the controller 100 determines that in node B, the bit in position 5 of the node information 820B corresponds to the page corresponding to logical address 13.

The controller 100 then modifies the mapping. In other words, the controller 100 modifies the root information 810 and the node information 820 and 820B.

In the root information 810, the controller 100 switches the bits in positions 4 and 13.

The controller then looks at the bits between positions 4 and 13 in the node information 810, as shown in FIG. 9C. The bits between positions 4 and 13 in the node information 810 are underlined in FIG. 9C. The code in positions 5-12 is "10101001".

Since there are 4 zeros in positions 5-12, the controller 100 determines that in the node information 820A, the bit corresponding to the page corresponding to logical address 4 will be shifted right by 4 positions. Consequently, the controller 100 shifts the bit corresponding to the page corresponding to logical address 4 right by 4 positions.

Since there are 4 ones, the controller 100 determines that in the node information 820B, the bit corresponding to the page corresponding to logical address 13 will be shifted left by 4 positions. Consequently, the controller 100 shifts the bit corresponding to the page corresponding to logical address 13 left by 4 positions.

In addition to modifying the root information 810, node information 820A and node information 820B, controller modifies the invalid vectors of the blocks having the switched pages, vectors 850A and 850C corresponding to blocks 1 and 3, respectively.

FIG. 9D illustrates the resulting mapping after the controller 100 switches the page corresponding to logical address 4 and the page corresponding to logical address 13.

Referring back to FIG. 9A, at S910, the controller 100 switches the page corresponding to logical address 5 and the page corresponding to logical address 14, as shown in FIG. 9A.

To make the switch, the controller determines the lowest common ancestor, which is node B. Therefore, the controller 100 only changes the bits corresponding to the page corresponding to logical address 5 and the page corresponding to logical address 14 in the code information 820B of node B.

The controller 100 determines the positions thee bits corresponding to logical addresses 5 and 15 from the root information 810, as previously described above.

The controller 100 determines from the root information 810, that in the node information 820B, the bit in position 2 corresponds to logical address 5, and the bit in position 6 corresponds to logical address 14. The controller then switches the bits in positions 2 and 6 and modifies the invalid vectors 850C and 850D, as shown in FIG. 9E.

At S915, the controller 100 switches the page corresponding to logical address 6 and the page corresponding to logical address 15, as shown in FIG. 9A.

At S920, the controller 100 switches the page corresponding to logical address 7 and the page corresponding to logical address 16, as shown in FIG. 9A.

S915 and S920 are performed in a similar manner as described above with regards to S905-S910. Therefore, for the sake of brevity, S915-S920 will not be described in greater detail.

Figure 9F:
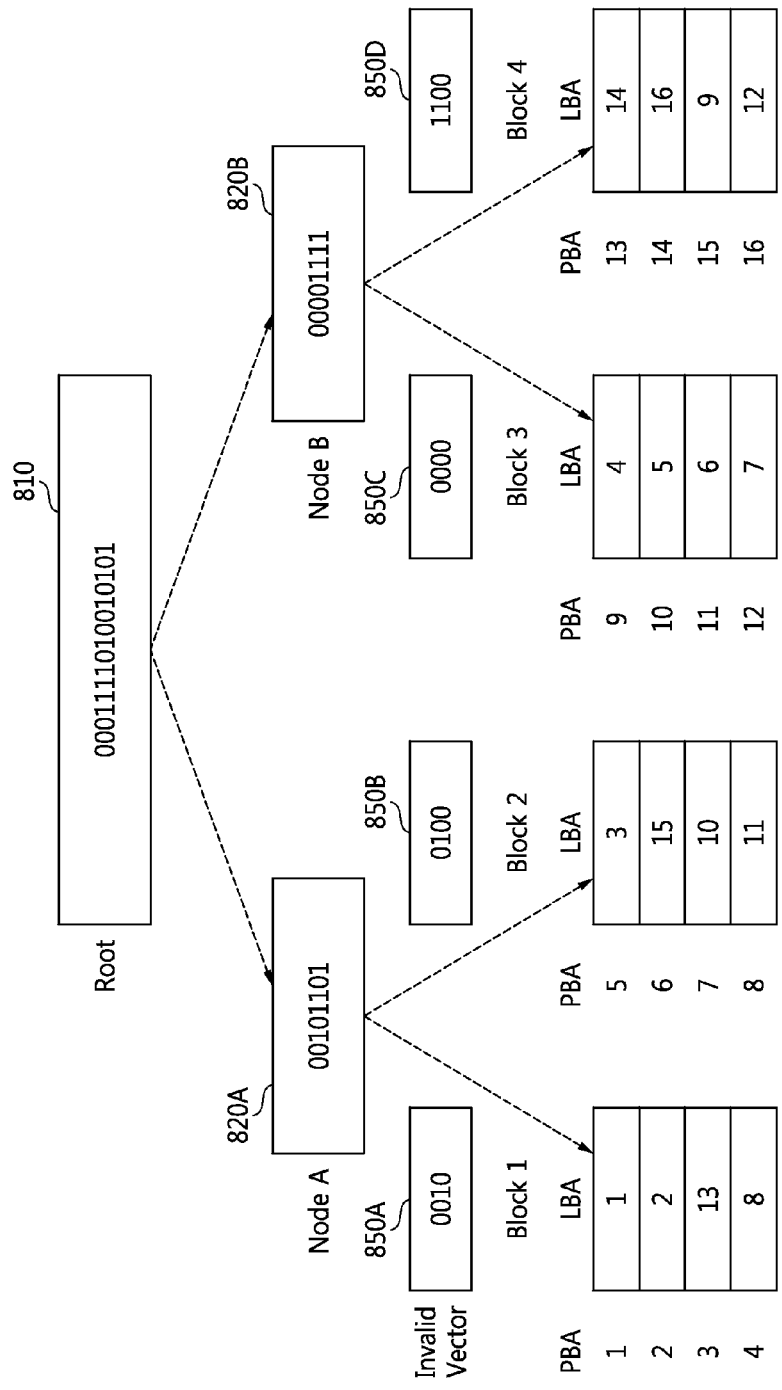

FIG. 9F illustrates the finalized root information 810, node information 820A and 820B and invalid vectors 850A-850D after the controller performs steps S905-S920.

It is understood that switching can be performed jointly for all pages of a block.

Reading with Invalid Pages and Garbage Collection

In FIG. 9F, the logical pages are no longer in ascending order for each block.

However, if only valid pages are considered by the controller 100, the valid pages are still in ascending order for each block (pages corresponding to logical addresses 13-16 are invalid).

In order to read the mapping when there are invalid pages, the controller 100 starts with the root information 810. To read the logical page 9, the controller knows the logical page 9 is on the right side because the bit in position 9 of the root information 810 is 1.

The sum of the code in positions 1-9 "000111101" is 5. Therefore, the controller 100 determines the bit in position 5 of the root information 820B is associated with logical page 9. The bit is 1 and therefore logical page 9 is in block 4.

The code of node information 820B in positions 1-5 is "00001". The sum of the bits is 1. Therefore, the logical page 9 is the first valid page of block 4.

The invalid vector of block 4 is "1100".

Since physical page 15 is the first valid page of block 4, it follows that logical page 9 is in the physical page 15 of block 4.

For garbage collection, the controller 100 determines the block with the minimal number of valid pages as a victim. In the example shown in FIG. 9F, block 4 is the victim.

Figure 9G:
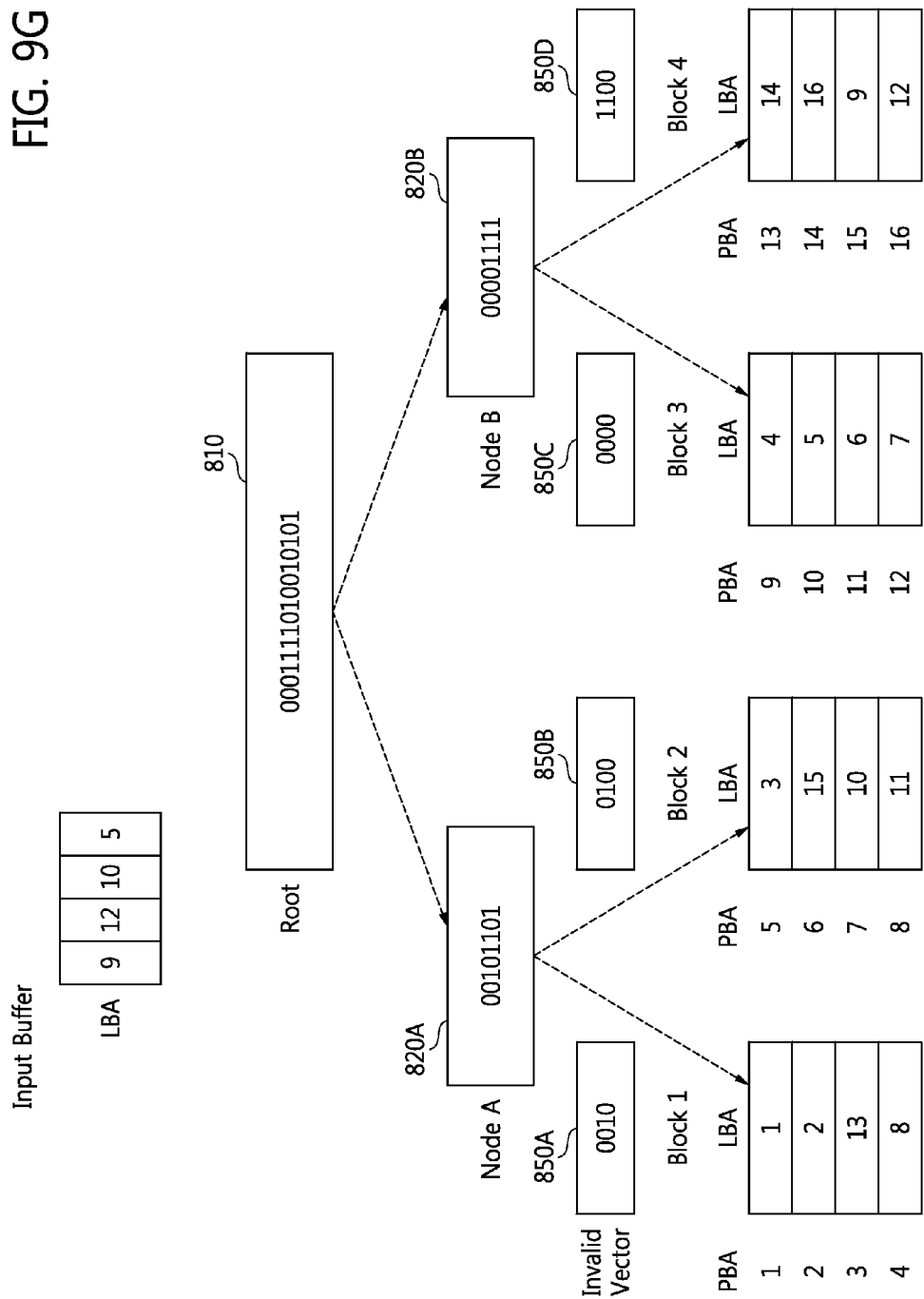

The controller 100 determines the valid pages in the victim block. In FIG. 9F, the valid logical pages in block 4 are pages 9 and 12. The controller then adds pages 9 and 12 to the pages in the input buffer, as shown in FIG. 9G. They join new logical pages 5 and 10 already in the input buffer.

The controller 100 then writes the logical pages in the input buffer into block 4. The writing is performed in the same manner as described above.

Discussion of an Example

Parameters of FTL Tree

In the example described below, the term "page" here is an atomic unit of random access. It should be understood, that the example described below may be performed by the memory system 1000. At a target device (e.g., the memory device 200), a number of bits per page C comprises $2^{15}$ bits, where there are n number of pages $2^{27}$ pages (in device of 512 Giga byte) and the set of logical pages is $[n]=\{1, \ldots, n\}$. A number of pages K of a memory buffer has $2^{12}$ pages (i.e. $2^{27}$ bits) is size of DRAM buffer (following optimization). The number K is equal to the number of physical pages in a physical cluster. A number of clusters M is n/K, where an i-cluster (i.e. physical superblocks) is an integer interval: $B_i=[K]+(i-1)\cdot K$.

The size of a (non-compressed) FTL directory is $n\cdot\log_2(n)$ (e.g. $27\cdot2^{27}$), K|n, where both are powers of 2·K is, e.g. $K=2^{12}$, i.e. buffer of $2^{29}$ bits). The size of the following compressed FTL directory is approximately $n\cdot(\log_2(n)-\log_2(K))$. In other words, the size of the compressed FTL direct is close to the theoretical minimum (i.e. entropy) for a buffer size K.

The overall DRAM memory dedicated to the FTL includes the FTL directory plus the memory buffer (e.g., $0.6\cdot27\cdot2^{27}$).

Each non-end node in the tree has V virtual children, where $V=2^v$ (e.g., v=3, V=8). Each virtual child corresponds to logical pages that are stored in the physical clusters. In the present example, there are 8 children to each node in the tree and 4 is the depth of the FTL tree (root is at depth 0). Each symbol of each node corresponds to a logical page that is stored in a physical cluster.

At an i-depth (i=0, 1, . . . ) of the tree there are $V^i$ nodes, each node being the size of $v\cdot n\cdot V^{-i}$ bits (i.e. root node is at depth 0 and its size is thus v·n). In detail: to each node in the tree a vector $(x_1, \ldots, x_k)$ is attached to each node in the tree, where $x_i\in\{1, \ldots, V\}$ is represented by v bits and k is the size of the node. At depth i, $k=n\cdot V^{-i}$. And for all $x\in\{1, \ldots, V\}|\{i:x_i=x\}|=k/V$.

A depth of the tree $D_T$ is $\log_V(n/K)-1$ (e.g., $D_T=4$).

For integers a,b, b>0, set mod*(a,b)=c where $c\in[b]$ and b|(a−c). The input of the scheme is FTL mapping (non-compressed). The FTL mapping can be represented by a 1-1 mapping, $G:[n]\to[n]$, where for each logical page, given by $a\in[n]$, it holds that b=[G(a)/K] is the physical cluster that stores a, and mod*(G(a),K) is the location (physical page) of the logical page a, within its physical cluster.

The memory buffer enables monotonity. The logical pages are ordered in an increasing order in their physical cluster. That is, for all $x,y\in[n]$ if G(x) and G(y) are in Bi for some i, then G(x)<G(y) if x<y.

For any vector $x=(x_1, \ldots, x_k)\in[V]^k$ and $1\leq i\leq k$ and $u\in[V]$, we denote the number of symbols from the type u in the sequence by: $Q(x,u)=|\{j\in[k]: x_j=u\}|$. We also define: $L(x,i)=|\{j\in[i]:x_j=x_i\}|$ as the number of symbols from the type $u=x_i$ in the sequence until $x_i$.

The tree structure, i.e., nodes index and the edges between them, is as follows. Let Ø be the index of the root node and set $T_0=\{Ø\}$—the tree at level zero. The depth $i=1, \ldots, D_T$ of the tree is: $T_i=\{(a_1, \ldots, a_i): a_j\in[V], 1\leq j\leq 1\}$. The FTL tree is defined by: $T=\cup_{0\leq i\leq D_T}T_i$ with a set of edges, $$E=\{((a_1, \ldots, a_i+),(a_0, \ldots, a_{i+1})): 0\leq i\leq T_D-1, a_j\in[V]\ 1\leq j\leq i+1\}.$$

The compressed FTL-directory can be viewed as a mapping F from T to $V^*=\cup_{0\leq i}[V]^i$ such that for node $t\in F(t)=(x_1, \ldots, x_k)$ where $x_i\in[V]$ and $k=n/V^i$ and for all $x\in[V]$: $|\{i:x_i=x\}|=k/V$. The mapping F is determined by the above raw FTL mapping G and G is decodable from F. When F is given, the controller may know with a few DRAM/SRAM readings and a few computations the physical assignment of a given logical page. That is, looking at F, the controller can find G(a) for any given $a\in[n]$.

In an example, the controller may maintain Root= $(y_1, \ldots, y_n)$ with $y_i=(x_i,b_i)$ where $x_i\in[V]$ and $b_i\in\{0,1\}$ says if the i logical page is valid or not.

Subdivision of the Tree

The controller divides the tree in to S slices where each slice is a standalone FTL tree for a consecutive sub interval of [n] of size Λ=n/S. The s slice (1≤s≤S) is an FTL directory for an interval $J_s=(s-1)\cdot\Lambda+[\Lambda]$ of logical pages (e.g., S=16, 32 or 64).

Each s∈[S] slice is an FTL-directory with respect to $J_s$, represented by a mapping $F_s$ from T to V*. For every node t of T: $F(t)=(F_1(t), \ldots, F_S(t))$. The vector attached to the t node of the s slice, $F_s(t)$, is an sub-interval of the above F(t) corresponding to $J_s$.

Division of the FTL tree to slices permits updating the FTL slice by slice by the controller. A layer of auxiliary information may allow each tree-slice to become an independent FTL directory for its respective interval $J_s$ of logical pages. When a given slice is updated by the controller, the rest of the slices remain uninterrupted active directories. While a slice is updated its pre-updated copy is stored so it can be used as directory. The number of slices S for the current example is 16. However, as stated above, the number of slices S is not limited thereto.

A number of nodes per tree slice $n_0$ is $(V^{DT+1}-1)/(V-1)$ (e.g., $n_0$=4681). A number of nodes at all slices $n_1$ is $S\cdot(V^{DT+1}-1)/(V-1)$ (e.g., $n_1$=74896). A number of nodes per tree slice excluding leaves $n_2$ is $(V^{DT}-1)/(V-1)$ (e.g., $n_2$=585). A number of nodes at all slices excluding leaves $n_3$ is $S\cdot(V^{DT}-1)/(V-1)$ (e.g., $n_3$=9360).

Figure 10:
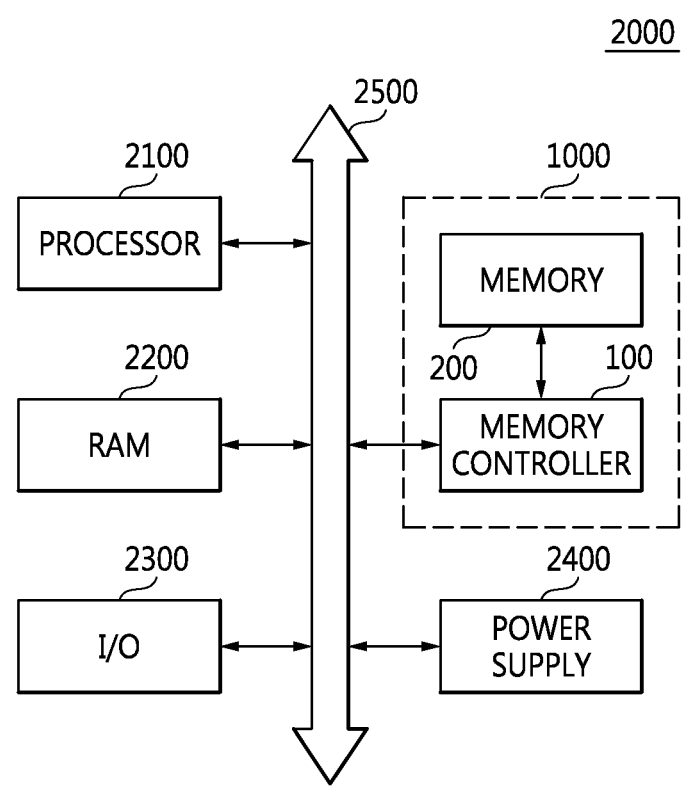
FIG. 10 is a block diagram of an electronic system adopting the memory system according to an example embodiment.

FIG. 10 is a block diagram of an electronic apparatus adopting a memory system according to an example embodiment of inventive concepts.

Referring to FIG. 10, an electronic apparatus 2000 includes a processor 210, a read-only-memory (RAM) 2200, an input/output device 2300, a power supply device 2400, and a memory system 1000. Although not shown in FIG. 23, the electronic apparatus 2000 may further include ports that may communicate with video cards, sound cards, or universal serial bus (USB) devices, or other electronic devices. The electronic device 2000 may be realized as a personal computer, or a portable electronic device such as a notebook computer, a mobile phone, a personal digital assistant (PDA), and a camera.

The memory system 1000 shown in FIG. 10 may be the memory system 1000, shown in FIG. 1.

The processor 2100 may perform certain calculations or tasks. Accordingly, the processor 2100 may be a microprocessor or a central processing unit (CPU). The processor 2100 may communicate with the RAM 2200, the input/output device 2300, and the memory system 1000 via a bus 2500 such as an address bus, a control bus, and a data bus. In some embodiments of the present inventive concept, the processor 2100 may be connected to an expanded bus such as peripheral component interconnect (PCI) bus.

The RAM 2200 may store data that is necessary to operate the electronic apparatus 2000. For example, the RAM 2200 may be a dynamic RAM (DRAM), a mobile DRAM, an SRAM, a PRAM, an FRAM, an RRAM, and/or an MRAM.

The input/output device 2300 may include an input unit such as a keyboard, a keypad, or a mouse, and an output unit such as a printer or a display. The power supply device 2400 may supply an operating voltage to operate the electronic apparatus 2000.

Figure 11:
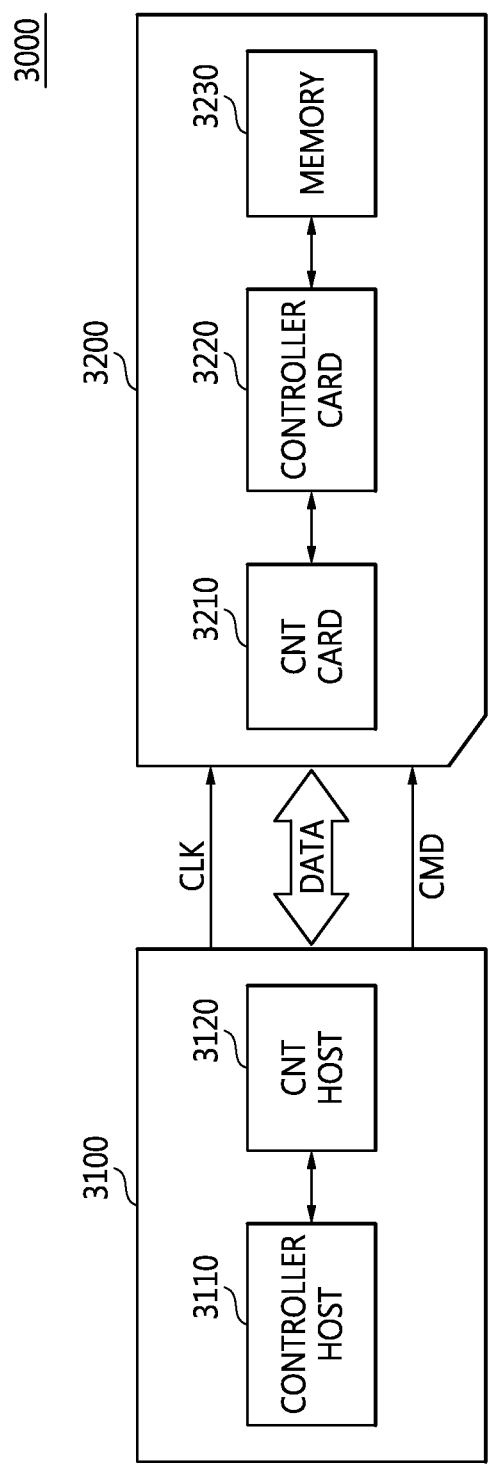
FIG. 11 is a block diagram of a memory card system adopting the memory system according to an example embodiment.

FIG. 11 is a block diagram of a memory card system including a memory system 3000 according to an example embodiment of inventive concepts.

Referring to FIG. 11, the memory card system 3000 may include a host 3100 and a memory card 3200. The host 3100 includes a host controller 3110, and a host connecting unit 3120. The memory card 3200 may include a card connecting unit 3210, a card controller 3220, and a memory device 3230.

The card controller 3220 and the memory device 3230 shown in FIG. 24 may be the memory controller 100 and the memory device 200, shown in FIG. 1.

The host 3100 may write data to the memory card 3200, or may read data stored in the memory card 3200. The host controller 3110 may transmit commands CMD, clock signals CLK generated in a clock generator (not shown), and data DATA to the memory card 3200 via the host connecting unit 3120.

The memory card 3200 may be a compact flash card (CFC), a microdrive, a smart media card (SMC), a multimedia card (MMC), a security digital card (SDC), a memory stick, or a US flash memory driver.

Figure 12:
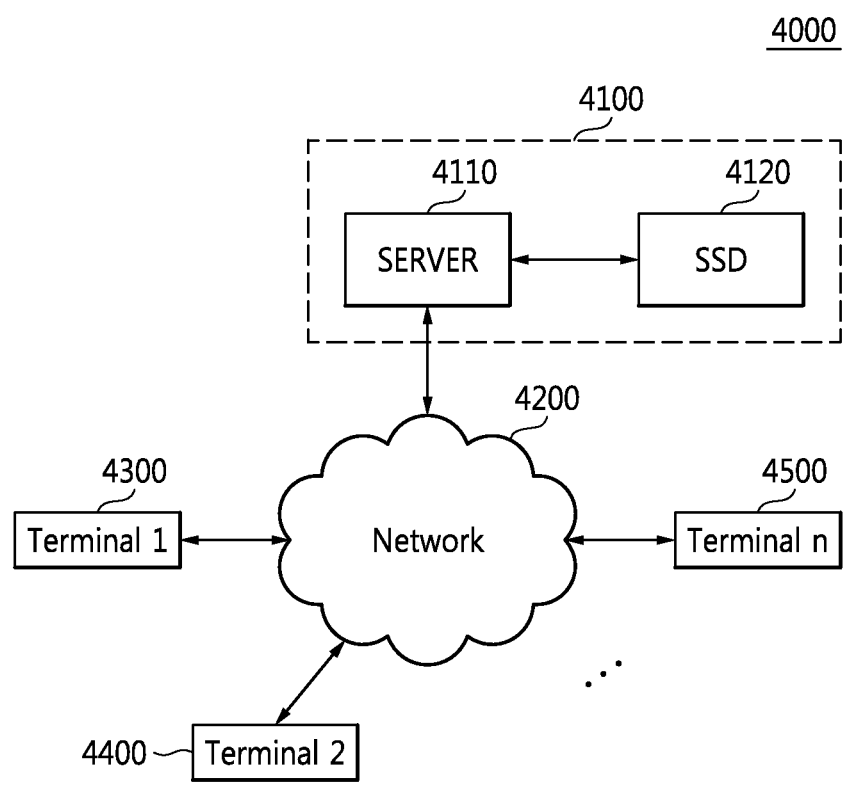
FIG. 12 is a block diagram of an example of configuring a network of a server system including an SSD according to an example embodiment.

FIG. 12 is a block diagram showing an example of network configuration about a server system 4100 including an SSD according to an example embodiment of inventive concepts.

Referring to FIG. 12, the network system 4000 may include a server system 4100, and a plurality of terminals 4300, 4400, and 4500 connected to each other via a network 4200. The server system 4100 of the present embodiment may include a server 4110 processing requests transmitted from the plurality of terminals 4300, 4400, and 4500 connected to the network 4200, and an SSD 4120 storing data corresponding to the requests transmitted from the terminals 4300, 4400, and 4500. Here, the SSD 4120 may be the memory system 1000, shown in FIG. 1.

Meanwhile, the memory system according to inventive concepts may be mounted by using various types of packages. For example, the memory system according to inventive concepts may be mounted by using packages such as a package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metricquad flat pack (MQFP), thin quad flatpack (TQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. A method of controlling a nonvolatile memory device including a plurality of blocks, each block including a plurality of physical pages, the method comprising:
   receiving a plurality of logical pages associated with a plurality of physical addresses, respectively;
   storing the plurality of logical pages at the plurality of physical addresses according to a given order of logical addresses of the logical pages; and
   obtaining a directory, the directory enabling access to a corresponding physical address of each stored logical page and the directory providing the corresponding physical address using the stored logical page as an input,
   wherein the obtaining includes, storing a set of incoming logical pages in a temporary memory;

storing the logical pages in an ascending order in a physical cluster; and generating a tree structure having a plurality of nodes, each of the plurality of nodes representing a subset of the logical addresses of logical pages, wherein the plurality of nodes include a plurality of non-leaf nodes, each of the non-leaf nodes having children nodes, an aggregation of the represented content of the children nodes of an associated non-leaf node is equal to the content of the associated non-leaf node.

2. The method of claim 1, wherein the nonvolatile memory device includes physical clusters, each physical cluster including a set of the plurality of physical pages.

3. The method of claim 1, wherein each node of the plurality of nodes includes a sequence of symbols, each symbol corresponding to a logical page.

4. The method of claim 3, wherein an order of the symbols in the non-leaf nodes determines the location of the corresponding logical pages within their corresponding children nodes.

5. The method of claim 4, wherein an order of the symbols in the leaf nodes determines a location of the corresponding logical pages within the physical cluster.

6. The method of claim 3, wherein each node comprises a second information layer, the second information layer including a set of integers, each of the set of integers is an order of one of the symbols in the non-leaf node, the one of the symbols belonging to a subset of the symbols belonging to the non-leaf node.

7. The method of claim 3, wherein the symbols are binary.

8. The method of claim 1, wherein the plurality of nodes include a plurality of leaf-nodes, the method further comprising:

decoding information associated with the plurality of leaf-nodes from the plurality of non-leaf nodes, each of the plurality of leaf-nodes corresponding to the physical cluster, the physical cluster including a set of the plurality of physical pages.

9. A memory system comprising:

a nonvolatile memory device including a plurality of blocks, each block including a plurality of physical pages; and a memory controller configured to, receive a plurality of logical pages associated with a plurality of physical addresses, respectively;

store the plurality of logical pages at the plurality of physical addresses according to a given order of logical addresses of the logical pages; and obtain a directory, the directory enabling access to a corresponding physical address of each stored logical page and the directory providing the corresponding physical address using the stored logical page as an input, and wherein the memory controller is configured to, store a set of incoming logical pages in a temporary memory;

store the logical pages in an ascending order in a physical cluster; and generate a tree structure having a plurality of nodes, each of the plurality of nodes representing a subset of the logical addresses of logical pages, wherein the plurality of nodes include a plurality of non-leaf nodes, each of the non-leaf nodes having children nodes, an aggregation of the represented content of the children nodes of an associated non-leaf node is equal to the content of the associated non-leaf node.

10. The memory system of claim 9, wherein the nonvolatile memory device includes physical clusters, each physical cluster including a set of the plurality of physical pages.

11. The memory system of claim 9, wherein each node of the plurality of nodes includes a sequence of symbols, each symbol corresponding to a logical page.

12. The memory system of claim 11, wherein an order of the symbols in the non-leaf nodes determines the location of the corresponding logical pages within their corresponding children nodes.

13. The memory system of claim 12, wherein an order of the symbols in the leaf nodes determines a location of the corresponding logical pages within the physical cluster.

14. The memory system of claim 11, wherein each node comprises a second information layer, the second information layer including a set of integers, each of the set of integers is an order of one of the symbols in the non-leaf node, the one of the symbols belonging to a subset of the symbols belonging to the non-leaf node.

15. The memory system of claim 11, wherein the symbols are binary.

16. The memory system of claim 9, wherein the plurality of nodes include a plurality of leaf-nodes, and the memory controller is configured to, decode information associated with the plurality of leaf-nodes from the plurality of non-leaf nodes, each of the plurality of leaf-nodes corresponding to the physical cluster, the physical cluster including a set of the plurality of physical pages.

* * * * *